United States Patent [19]

Suzuki et al.

[11] Patent Number: 5,005,460
[45] Date of Patent: Apr. 9, 1991

[54] MUSICAL TONE CONTROL APPARATUS

[75] Inventors: Hideo Suzuki; Shunichi Matsushima; Masahiko Obata; Masao Sakama; Akira Nakada; Shinji Kumano, all of Hamamatsu, Japan

[73] Assignee: Yamaha Corporation, Hamamatsu, Japan

[21] Appl. No.: 289,181

[22] Filed: Dec. 22, 1988

[30] Foreign Application Priority Data

Dec. 24, 1987 [JP] Japan .................. 62-328061
Dec. 24, 1987 [JP] Japan .................. 62-328062
Dec. 24, 1987 [JP] Japan .................. 62-328064
Dec. 24, 1987 [JP] Japan .................. 62-328065
Dec. 24, 1987 [JP] Japan .................. 62-328066
Dec. 24, 1987 [JP] Japan .................. 62-328067
Dec. 25, 1987 [JP] Japan .................. 62-328797

[51] Int. Cl.$^5$ .................. G10H 1/06; G10H 1/18; G10H 1/34
[52] U.S. Cl. .................. 84/600; 84/615; 84/622; 84/644
[58] Field of Search .................. 84/1.01, 1.03–1.16, 84/1.19–1.28, 327, 329, DIG. 7, DIG. 20, 600, 622–633, 644, 659–665, 687–690, 692–711, 615–620; 128/774, 782; 273/183 R, 183 B, 186 R, DIG. 19; 341/20–35; 446/397, 408; 901/2, 3, 14–18; 338/2, 5, 47, 69, 114

[56] References Cited

U.S. PATENT DOCUMENTS

| | | | |
|---|---|---|---|
| 2,135,476 | 11/1938 | Rugh | 273/DIG. 19 |
| 3,166,856 | 1/1965 | Uttal | 341/20 |
| 3,624,583 | 11/1971 | Nakada | 84/1.24 X |
| 3,626,350 | 12/1971 | Suzuki et al. | 84/DIG. 7 |
| 3,681,507 | 8/1972 | Slaats et al. | 84/DIG. 7 |
| 3,704,339 | 11/1972 | Niinomi . | |
| 3,705,948 | 12/1972 | Tomisawa | 84/1.24 |
| 3,808,707 | 5/1974 | Fink | 273/183 B X |
| 3,833,751 | 9/1974 | Chapman | 84/327 X |
| 4,022,097 | 5/1977 | Strangio | 84/1.03 |
| 4,341,140 | 7/1982 | Ishida . | |
| 4,414,537 | 11/1983 | Grimes | 341/20 |
| 4,444,205 | 4/1984 | Jackson | 128/782 |
| 4,470,332 | 9/1984 | Aoki | 84/1.03 |
| 4,542,291 | 9/1985 | Zimmerman | 341/31 |
| 4,602,544 | 7/1986 | Yamada | 84/1.01 |
| 4,627,324 | 12/1986 | Zwosta . | |
| 4,635,516 | 1/1987 | Giannini | 84/1.01 |
| 4,660,033 | 4/1987 | Brandt | 341/20 |
| 4,715,235 | 12/1987 | Fukui et al. | 338/99 X |
| 4,753,146 | 6/1988 | Seiler | 84/1.01 |
| 4,776,253 | 10/1988 | Downes . | |
| 4,794,838 | 1/1989 | Corrigau | 338/69 X |
| 4,920,848 | 5/1990 | Suzuki . | |

FOREIGN PATENT DOCUMENTS 63-127773 5/1963 Japan .
2029070 3/1980 United Kingdom ......... 84/DIG. 20

Primary Examiner—Stanley J. Witkowski
Attorney, Agent, or Firm—Spensley Horn Jubas & Lubitz

[57] ABSTRACT

A musical tone control apparatus comprises a main unit and at least one detector for detecting movement of player's finger, hand and the like. The main unit can be mounted on a player's wrist by use of a belt. When plural detectors are provided for detecting movements of player's fingers, tone color, tone pitch of musical tone or key-on timing is controlled based on combination of bent fingers. In order to detect bending of each finger, a joint switch is provided for each finger. In order to prevent deviation of key-on signals, a comparator is further used for comparing the predetermined threshold value with detection value corresponding to the bending of each finger so that the key-on signal is generated when the detection value exceeds the threshold value.

16 Claims, 19 Drawing Sheets

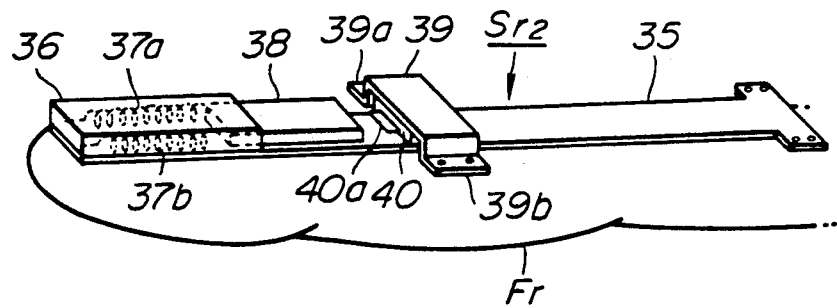
FIG. 5
*(PRIOR ART)*
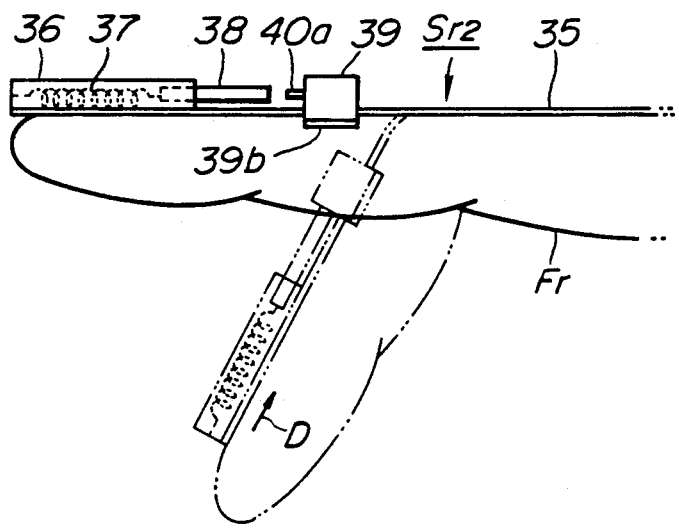
FIG. 6
*(PRIOR ART)*
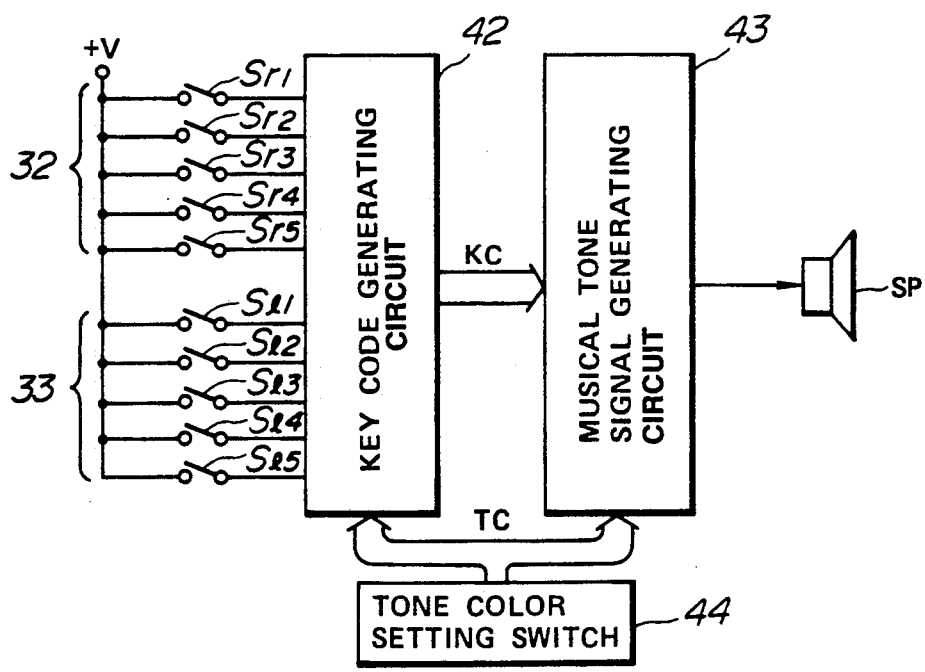
FIG. 7 *(PRIOR ART)*

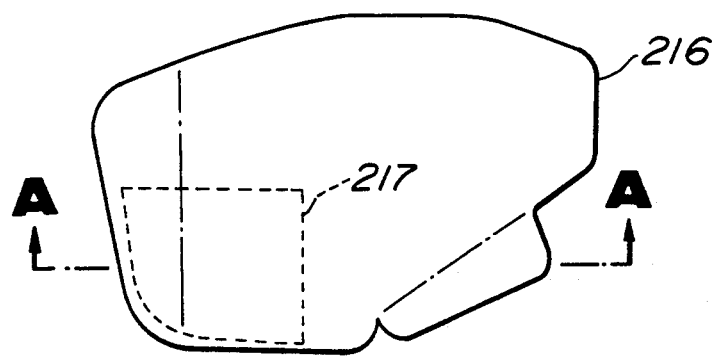
FIG.15
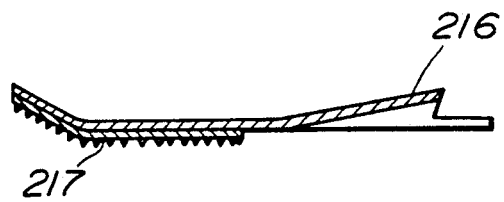
FIG.16
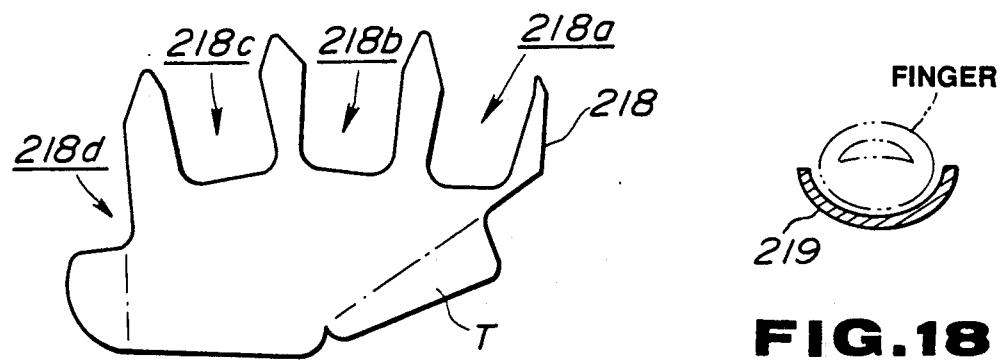
FIG.17
FIG.18

|  | RIGHT HAND | | | | LEFT HAND | |
|---|---|---|---|---|---|---|
|  | INDEX FINGER | MIDDLE FINGER | THIRD FINGER | | INDEX FINGER | MIDDLE FINGER |
| DO | × | × | × | | × | × |
| RE | ○ | × | ○ | | | |
| MI | ○ | ○ | × | | | |
| FA | ○ | × | × | | | |
| SO | × | × | × | | × | ○ |
| LA | ○ | ○ | × | | | |
| SI | × | ○ | × | | | |
| DO | × | × | × | | ○ | × |
| RE | ○ | × | × | | | |
| MI | × | × | × | | ○ | ○ |
| FA | ○ | × | × | | | |

○ : ON
× : OFF

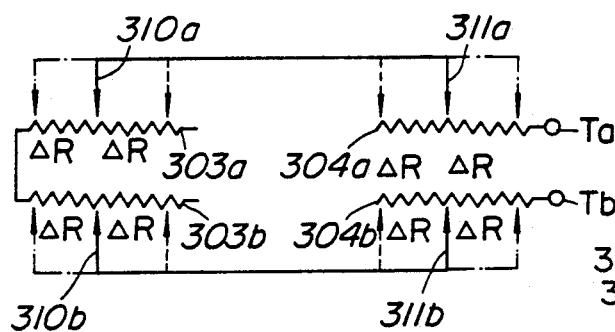
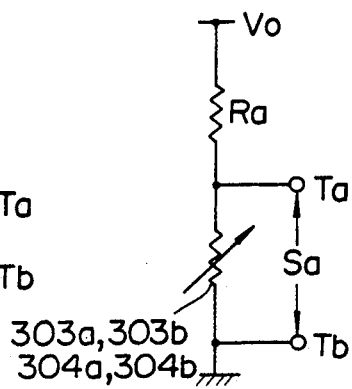
FIG. 30  FIG. 31
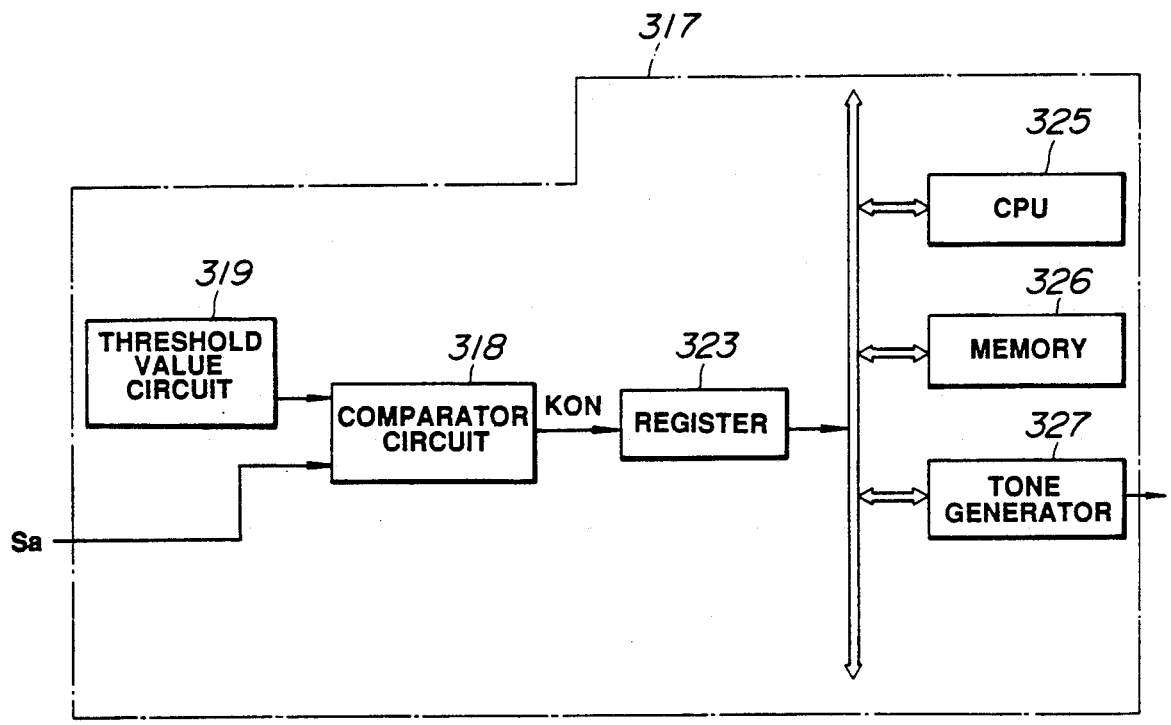
FIG. 32

MUSICAL TONE CONTROL APPARATUS

BACKGROUND OF THE INVENTION

1. Field of the Invention

The present invention relates to a musical tone control apparatus, and more particularly to a musical tone control apparatus which controls a musical tone in response to bending and stretching movements of player's fingers and the like.

2. Prior Art

A musical tone control apparatus capable of converting player's movement into the musical tone has been developed as disclosed in Japanese Patent Application No. 61-274345, for Musical Tone Control Apparatus Using a Detector, filed Oct. 13, 1987, assigned to the same assignee as the present Applicant see U.S. Pat. Application Ser. No. 108,205). FIGS. 1 and 2 are views showing detailed constitution of this musical tone control apparatus. This apparatus comprises a main unit 1, detecting portion 2 for right elbow, detecting portion 3 for left elbow and detecting portion 4 for right hand. The main unit 1 is mounted to player's waist by a belt 5. The detecting portions 2, 3 and 4 are respectively mounted to player's right elbow, left elbow and right hand. In addition to the musical tone control unit, the main unit 1 further provides a musical tone signal generating circuit and speaker.

Next, description will be given with respect to the detecting portions 2, 3 and 4. First, the detecting portion 2 includes a supporter 7a, thin type potentiometer 8a and lever 12a which is mounted to a sliding member of potentiometer 8a. When a right arm joint is moved, the lever 12a revolves the sliding member of potentiometer 8a. The detecting portion 3 is constituted as similar to the detecting portion 2. When a left arm joint is moved, a lever 12b revolves a sliding member of a potentiometer 8b. These potentiometers 8a and 8b have respective terminals which are respectively connected to the main unit 1 via wires 15a and 15b.

In the detecting portion 4, 16 designates a glove made from stretch fiber material. At partial portion of this glove which covers wrist joint of player's right hand, a potentiometer 8c is mounted. Similar to the detecting portion 2, a lever 12c is fixed at a sliding member of this potentiometer 8c, and this lever 12c is mounted to the glove 16. In addition, at an inner portion of each finger tip of this glove 16, each of pressure sensitive elements 17a to 17d is mounted. The specific resistance of this pressure sensitive element varies in response to the depressing pressure applied from each finger tip. In the case where the finger is stretched, the depressing pressure is not effected to each pressure sensitive element. On the contrary, in the case where the finger is bent, the depressing pressure corresponding to a bending angle of finger is effected to each pressure sensitive element so that its specific resistance will be varied. The terminals of potentiometer 8c and pressure sensitive elements 17a to 17d are respectively connected to the main unit 1 via a wire 15c.

Next, in FIG. 2, 20 designates an analog multiplexer of seven channels which selects and outputs one of the detection signals (i.e., voltage signals) from the potentiometers 8a to 8c and pressure sensitive elements 17a to 17d based on a channel select signal CS supplied to its select terminal. 21 designates an analog-to-digital (A/D) converter which converts the detection signal outputted via the analog multiplexer 20 into digital detection data of predetermined bits. In addition, 22 designates a central processing unit (CPU), 23 designates a read only memory (ROM) for storing programs used in the CPU 22, and 24 designates a random access memory (RAM) which is used as a work area.

The CPU 22 supplies the channel select signal CS which sequentially varies to the analog multiplexer 20 to thereby scan the outputs of potentiometers 8a to 8c and pressure sensitive elements 17a to 17d with high speed. In addition, based on first detection data which are obtained by converting the detection signals from the potentiometers 8a and 8b in the A/D converter 21, the CPU 22 judges bending angles of right and left elbows by four angle stages. Then, based on such judgement result, the CPU 22 generates key code data KC for designating the predetermined tone pitch in response to combination of the bending angles of right and left elbows. In addition, based on second detection data which are obtained by converting the detection signal from the potentiometer 8c, a bending angle of right wrist is judged by three angle stages. Then, based on such judgement result, the CPU 22 generates tone volume data VOL for designating tone volume (i.e., large, middle and small tone volume) in response to the bending angle of right wrist. Further, based on third detection data which are obtained by converting the detection signals from the pressure sensitive elements 17a to 17d, the CPU 22 judges whether each of index finger, middle finger, third finger and little finger is bent or not. Based on such judgement result, the CPU 22 generates tone color designating data TD for designating the predetermined tone color (e.g., tone color of piano, organ, flute, saxophone clarinet etc.) in response to combination of bent fingers.

These key code data KC, tone volume data VOL and tone color designating data TD (all of which are called "musical tone control data") generated in the CPU 22 are supplied to a musical tone signal generating circuit 26 via a bus line 25. The musical tone signal generating circuit 26 generates the musical tone signal having the tone pitch corresponding to the key code data KC, the tone volume corresponding to the tone volume data VOL and the tone color corresponding to the tone color designating data TD. This musical tone signal is supplied to the speaker 27 from which the corresponding musical tone is generated. In addition, a transmitter circuit 28 transmits the musical tone signal by wireless.

However, the above-mentioned musical tone control apparatus is disadvantageous in that the main unit 1 is bulky so that this main unit 1 disturbs the player's movement.

As another conventional musical tone control apparatus, the present applicant has developed a musical tone generating apparatus capable of generating the musical tone corresponding to the bending and stretching movement of finger as disclosed in Japanese Patent Application No. 62-44233 (see U.S. Pat. Application Ser. No. 161,176, Finger Switch, filed Feb. 26, 1988, assigned to the same assignee as the present Applicant).

FIG. 3 shows an outer appearance of this musical tone generating apparatus. This apparatus includes a main unit 31, detecting portion 32 for right hand and detecting portion 33 for left hand. The main unit 31 is mounted to the player's waist by a belt 34.

FIG. 4 is a perspective side view showing a diagrammatical constitution of the detecting portion 32. In FIG. 4, Fr designates a glove, and Sr1 to Sr5 are detectors (hereinafter, referred to as finger switches) each mounted to the back of each finger of the glove Fr. Each of these finger switches Sr1 to Sr5 is constituted as shown in FIG. 5, for example. In FIG. 5, 35 designates a rectangular thin plate formed by plastics, and one edge portion thereof is fixed at a finger root portion of the glove Fr. At another edge portion of thin plate 35, a cylinder 36 whose opening directs toward the finger root portion is mounted. One edges of springs 37a and 37b are fixed at bottom portion of this cylinder 36, while other edges thereof is fixed at one edge of a movable member 38. Therefore, the movable member 38 can freely slide within the cylinder 36. A gate member 39 having U shape is mounted on the middle portion between first joint and second joint of each finger portion of the glove Fr so that the thin plate 35 can be passed through. A push button switch 40 is mounted at the gate member 39, wherein the push button switch 40 has a push button 40a whose projection sticks out in the finger tip direction.

In the above-mentioned finger switch Sr2, when the player bends his finger at its second joint as shown in FIG. 6, the thin plate 35 is moved in D direction so that the tip edge of movable member 38 pushes the push button 40a. Thus, the push button switch 40 must be turned on. Then, when the player stretches his finger, the push button switch 40 is turned off. In FIG. 3 similar to the detecting portion 32, the detecting portion 33 provides a glove Fl to which finger switches S11 to S15 (not shown) are respectively mounted.

Next, FIG. 7 is a block diagram showing an electric constitution of the above-mentioned musical tone generating apparatus. In FIG. 7, 42 designates a key code generating circuit which converts the outputs of detecting portions 32 and 33 into the key code KC. In this case, one edges of the finger switches Sr1 to Sr5 and S11 to S15 are respectively connected to input terminals of the key code generating circuit 42 by cables. A constant voltage +V is applied to the other edges of these finger switches. The key code KC is supplied to a musical tone signal generating circuit 43 wherein the key code KC is converted into the musical tone signal. In addition, a tone color setting switch 44 changes several constants of the key code generating circuit 42 and musical tone signal generating circuit 43 to thereby change the tone color. Further, SP designates a speaker. These key code generating circuit 42, musical tone signal generating circuit 43, tone color setting switch 44 and speaker SP are all included within the main unit 31.

The outputs of finger switches are supplied to the key code generating circuit 42 wherein the key code KC corresponding to the musical scale (i.e., tones "do", "re", "mi", "fa", "so", "la" and "si") is generated. Such key code KC is supplied to the musical tone signal generating circuit 43 wherein the musical tone signal having the musical scale corresponding to the supplied key code KC is generated and then outputted to the speaker SP. Thus, the speaker SP is driven by this musical tone signal.

However, since the above-mentioned finger switch uses the flat thin plate, the bending point of thin plate must be varied in response to the mounting state of glove. For this reason, the player must confirm the bending angle of finger where the finger switch is turned on in advance. In addition, the constitution of above finger switch must be complicated, and each finger switch must be made by changing the size thereof in accordance with the size of each finger. Therefore, there is a problem in that the production cost of finger switches must become higher.

The above-mentioned musical tone control apparatus generates a key-on signal when the finger is bent. On the other hand, in Japanese Patent Application No. 62-23381, an acceleration sensor is provided in order to detect an acceleration in the movement of player's body, and the output signal of this acceleration sensor is compared with the predetermined threshold value to thereby generate the key-on signal. At the timing when the above key-on signal is generated, the musical tone is generated. In the case where the acceleration sensor for outputting an analog signal is used, such analog signal is stored in a register and the like and used for controlling the tone volume and the like.

However, in the conventional musical tone control apparatus, the position where the finger switch is turned on must be determined because of its construction, and the threshold value must be fixed. Hence, it is impossible to adjust the timing for generating the musical tone in response to the way of each player of moving his finger and the like. In addition, chattering of switches and deviation of player's movement affects the key-on signal such that the key-on signal must become unstable. Further, the conventional musical tone control apparatus uses the signal level of movement detecting signal as it is, and such signal level is not adjusted in response to the performing state.

SUMMARY OF THE INVENTION

It is accordingly a primary object of the present invention to provide a musical tone control apparatus which can control the musical tone in response to the bending movements of player's hand or foot.

It is another object of the present invention to provide a musical tone control apparatus which does not disturb the player's movement.

It is still another object of the present invention to provide a musical tone control apparatus in which the bending point of each finger switch can be set constant and the constitution of finger switch can be simplified.

It is a further object of the present invention to provide a musical tone control apparatus capable of generating the key-on signal stably.

In a first aspect of the invention, there is provided a belt type musical tone control apparatus comprising:

(a) detecting means for detecting movement of player; and (b) control means mounted at player's waist by use of a belt, the control means generating musical tone control data based on detection result of the detecting means, the musical tone control data being outputted to an externally provided musical tone generating apparatus from which a musical tone controlled by the musical tone control data is generated, the control means including several circuit parts which are held in plural modules, the plural modules being arranged respectively and independently along a longitudinal direction of the belt.

In a second aspect of the invention, there is provided a musical tone control apparatus comprising:

(a) a supporting member which, has a shape fitting with the palm of hand or back of hand without fingers;

(b) finger members each having a shape fitting with each finger in its longitudinal direction, the finger members being mounted to the supporting member, the supporting member and the finger members constituting a glove-shaped detecting portion for detecting movements of fingers;

(c) joint switches each mounted at a joint portion of each finger member which is formed to be easily bent in accordance with bending movement of each finger, each of the joint switches being turned on when each finger member is bent; and (d) musical tone control means for generating musical tone control information based on combination of on/off states of the joint switches.

In a third aspect of the invention, there is provided a musical tone control apparatus comprising:

(a) detecting means mounted to fingers of player for detecting movements of fingers; and (b) mounting means having a glove shape which can be worn by player's hand, the detecting means being attached to the mounting means; and (c) musical tone control means for generating musical tone control information based on detecting result of the detecting means.

In a fourth aspect of the invention, there is provided a musical tone control apparatus comprising:

(a) means whose resistance is varied in response to bending of player's finger;

(b) converting means for converting the resistance of the means into an electric signal; and (c) musical tone control means for generating a musical tone control signal based on the electric signal, the musical tone control signal controlling a musical tone in response to the bending of player's finger.

In a fifth aspect of the invention, there is provided a musical tone control apparatus comprising:

(a) sensor means for outputting movement detecting information in response to movement of player;

(b) memory means for pre-storing a threshold value;

(c) rewriting means capable of arbitrarily rewriting the threshold value in the memory means;

(d) comparator means for comparing the threshold value with value of the movement detecting information; and (e) musical tone control means for generating a musical tone control signal in accordance with comparing result of the comparator means.

In a sixth aspect of the invention, there is provided a musical tone control apparatus comprising:

(a) sensor means for outputting movement detecting information in response to movement of player;

(b) first memory means for storing a first threshold value;

(c) second memory means for storing a second threshold value, the first threshold value is set smaller than the second threshold value;

(d) comparator means for comparing value of the movement detecting information with the first and second threshold values; and (e) musical tone control means which outputs or stops outputting a musical tone control signal based on comparing result of the comparator means.

BRIEF DESCRIPTION OF THE DRAWINGS

Further objects and advantages of the present invention will be apparent from the following description, reference being had to the accompanying drawings wherein preferred embodiments of the present invention are clearly shown.

In the drawings:

FIGS. 5 and 6 are perspective side views showing the mechanical constitution and operation of the conventional finger switch;

FIG. 7 is a block diagram showing the electric constitution of the conventional musical tone generating apparatus;

FIG. 15 is a plan view showing a first supporting portion which is used in the detecting portion shown in FIG. 14;

FIG. 16 is a sectional view taken in the direction of arrows along the line A—A in FIG. 16;

FIG. 17 is a plan view showing a second supporting portion which is used in the detecting portion shown in FIG. 14;

FIG. 18 is a sectional view taken in the direction of arrows along the line B—B in FIG. 14;

FIGS. 30 and 31 are circuit diagrams for explaining the third embodiment;

FIG. 32 is a block diagram showing an electric constitution of the third embodiment;

DESCRIPTION OF PREFERRED EMBODIMENTS

Figure 1:
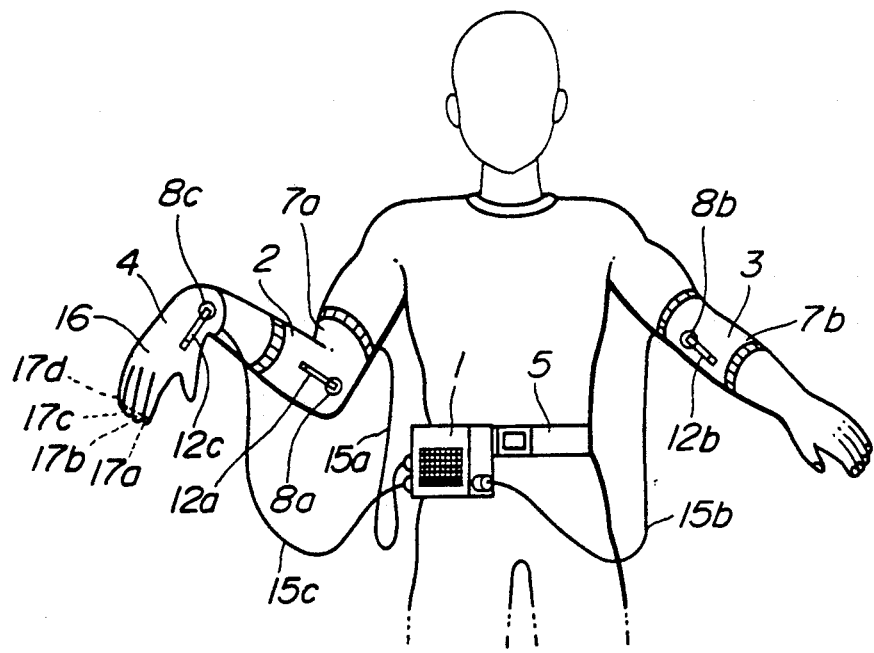
FIG. 1 is an outer appearance of player to whom the conventional musical tone control apparatus is mounted.
Figure 2:
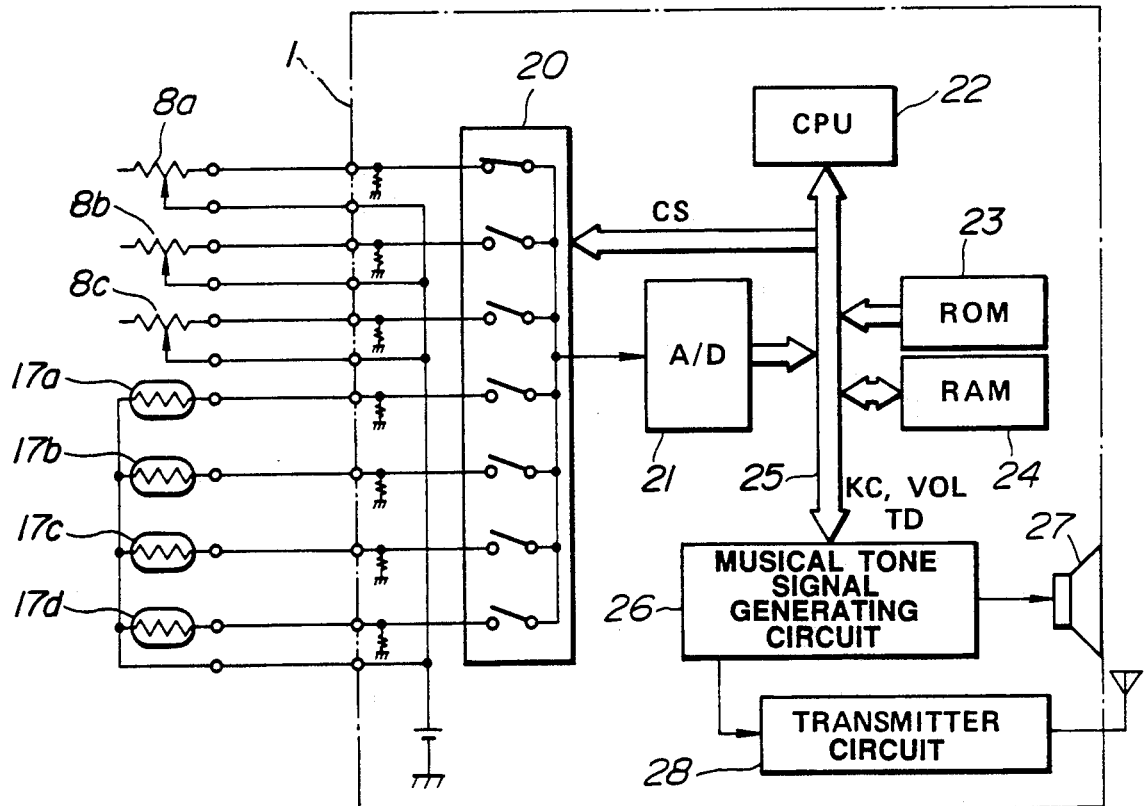
FIG. 2 is a block diagram showing an electric constitution of the musical tone control apparatus shown in FIG. 1.
Figure 3:
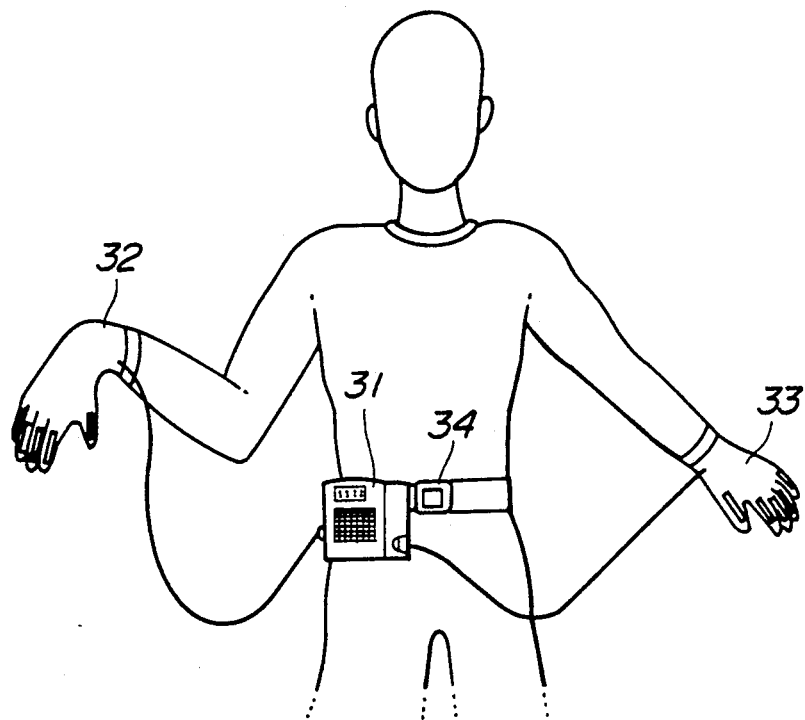
FIG. 3 is an outer appearance of player to whom the conventional musical tone generating apparatus is mounted.
Figure 4:
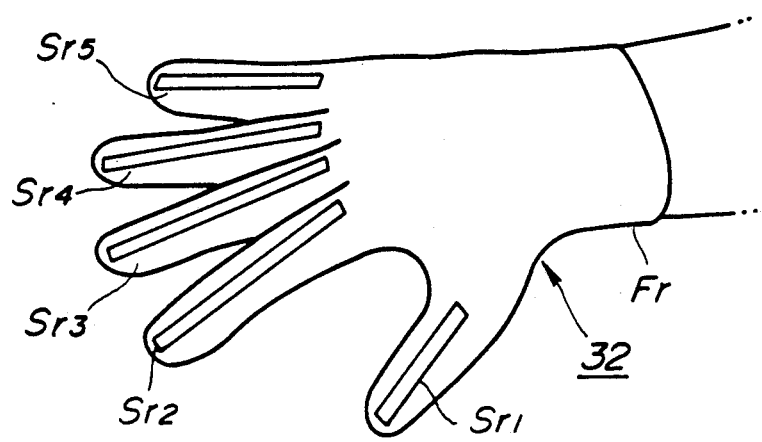
FIG. 4 is a perspective side view showing the detecting portion shown in FIG. 3.

Next, description will be given with respect to the preferred embodiments of the present invention, wherein like reference characters designate like or corresponding parts throughout the several views.

[A] FIRST EMBODIMENT

Figure 8:
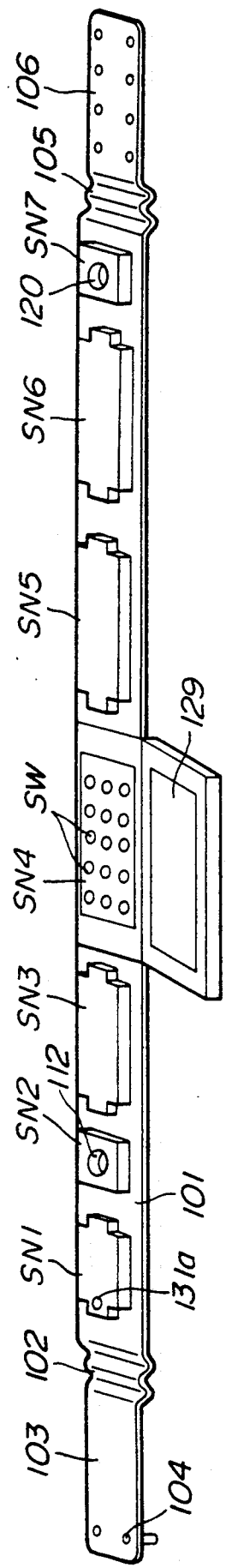
FIG. 8 is a perspective side view showing a belt type musical tone control apparatus according to a first embodiment.
Figure 9:
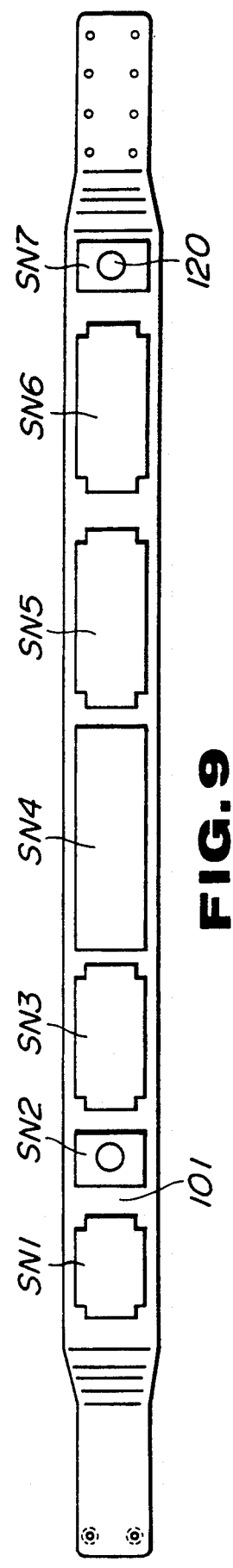
FIGS. 9 and 10 are plan view and side view of the first embodiment.
Figure 10:
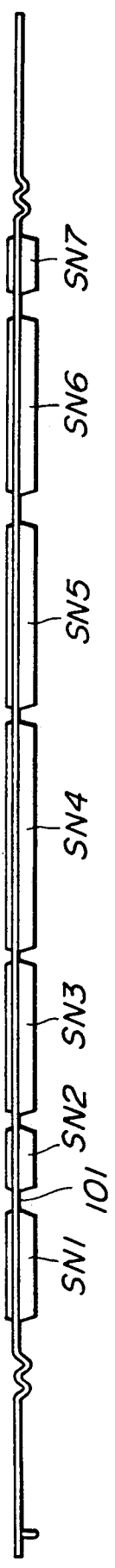
Figure 11:
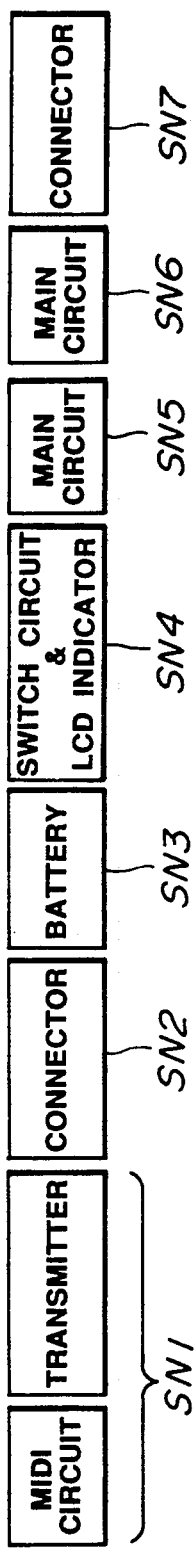
FIG. 11 is a diagram showing circuits held in holding portions in the first embodiment.
Figure 12:
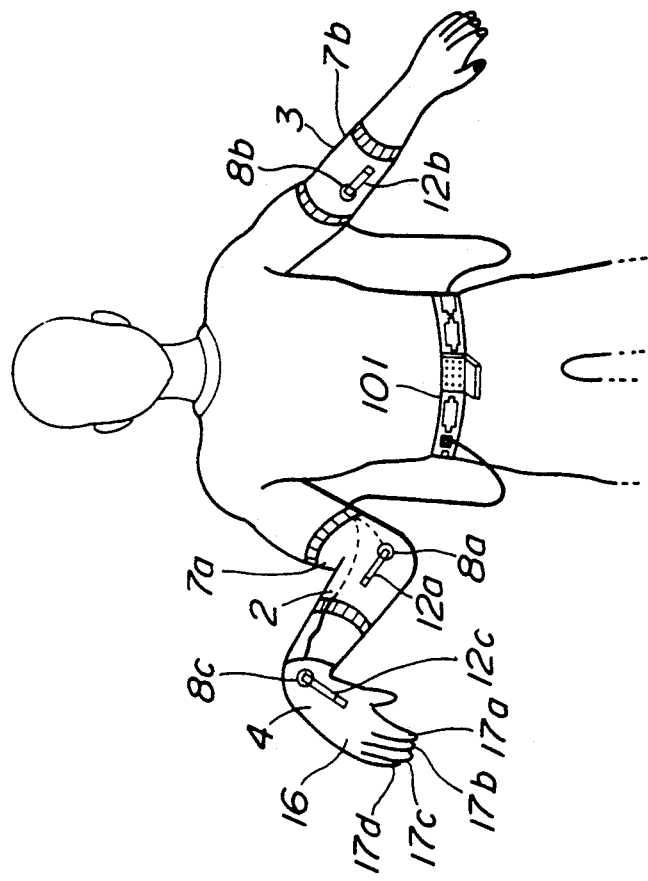
FIG. 12 is an outer appearance of player who mounts the first embodiment at his waist.
Figure 13:
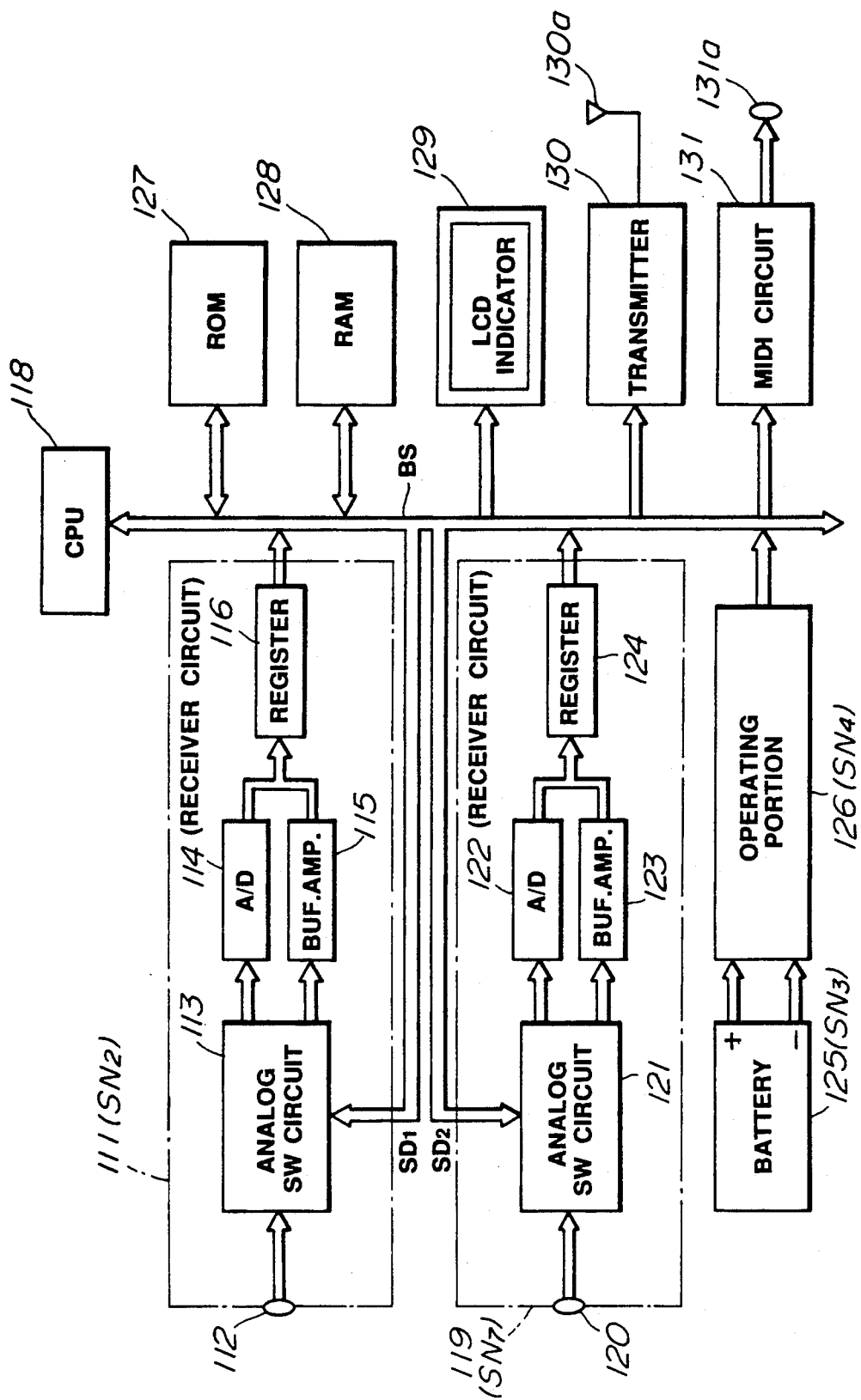
FIG. 13 is a block diagram showing the first embodiment.

FIG. 8 is a perspective side view showing the belt type musical tone control apparatus according to the first embodiment, and FIGS. 9 and 10 are plan view and side view thereof. FIG. 11 is a diagram showing each circuit held in each holding portion of the belt type musical tone control apparatus. FIG. 12 is a view showing the player to whom the belt type musical tone control apparatus is mounted, and FIG. 13 is a block diagram showing the circuit constitution of the first embodiment. As shown in FIG. 10, each module is actually covered in the first embodiment. However, for better understanding, each module is shown without covering in FIGS. 8 and 9.

In FIGS. 8 to 10, 101 designates a belt made of the resin. A hook mounting portion 103 is connected to the left edge portion of this belt 101 via a connecting portion 102. At the lower face of this hook mounting portion 103, hooks 104 made of metal are attached. On the other hand, a hook receiving portion 106 is connected to the right edge portion of this belt 101 via a connecting portion 105. Plural hook holes for receiving the hooks 104 are formed at the hook receiving portion 106. In the center portion of this belt 101, holding portions SN1 to SN7 each holding an electric part are arranged. Within these holding portions SN1 to SN7, the holding portion SN4 has a cover which can be opened and closed. It is apparent from FIG. 10 that upper portions of holding portions SN1 to SN7 are relatively thin as compared to lower portions thereof. Such construction is employed in order that the thickness of this musical tone control apparatus is seemed to be relatively thin as compared to the real thickness when this musical tone control apparatus is mounted at the player's waist.

Next, in FIG. 13, 111 designates a receiver circuit held in the holding portion SN2. This receiver circuit 111 comprises a connector 112, analog switch circuit 113, analog-to-digital (A/D) converter 114, buffer amplifier 115 and register 116. The connector 112 is a terminal to which a signal from a sensor (e.g., the potentiometer 8a and the like shown in FIG. 1) is supplied, and this connector 112 is connected to the input terminal of analog switch 113. This signal supplied to the connector 112 can include a digital signal and analog signal. The analog switch circuit 113 is constituted by plural analog switches. Based on select data SD1 supplied from a CPU 118, the signal inputted to the connector 112 is supplied to the selected one of A/D converter 114 and buffer amplifier 115 via the analog switch circuit 113. The A/D converter 114 converts the output of analog switch circuit 113 into digital data which are then outputted to the register 116. On the other hand, the buffer amplifier 115 amplifies the output of analog switch circuit 113 and then the amplified output is outputted to the register 116. The register 116 stores and then outputs the data outputted from the A/D converter 114 or buffer amplifier 115 to a bus line BS of the CPU 118.

Similar to the above-mentioned receiver circuit 111, a receiver circuit 119 is constituted. More specifically, the receiver circuit 119 comprises a connector 120, analog switch 121, A/D converter 122, buffer amplifier 123 and register 124. This receiver circuit 119 is held in the holding portion SN7.

In addition, 125 designates a battery for supplying dc voltage to each portion, and this battery 125 is held in the holding portion SN3. Further, an operating portion 126 is held in the holding portion SN4. This operating portion 126 comprises plural push switches SW (see FIG. 8) and encoder (not shown) which encodes the outputs of operated push switches SW. The encoded output of this encoder is outputted to the bus line BS.

Further, 127 designates a ROM for storing programs of the CPU 118, 128 designates a RAM for storing data and 129 designates a liquid crystal display (LCD) indicator. The CPU 118 and ROM 127, and RAM 128 are respectively held in the holding portions SN5 and SN6, while the LCD indicator 129 is held in the holding portion SN4. When the cover of holding portion SN4 is opened, the LCD indicator 129 can be watched as shown in FIG. 8. 130 designates a transmitter in which tone pitch data, tone color data, tone volume data, key-on/off signals etc. supplied from the CPU 118 are mixed with the carrier wave and then transmitted via an antenna 130a. Furthermore, 131 designates a musical instrument digital interface (MIDI) circuit held in the holding portion SN1. This MIDI circuit 131 converts the above-mentioned tone pitch data, tone color data, tone volume data, key-on/off signals etc. into the data of MIDI standard, and then such data are outputted to an output terminal 131a.

Next, description will be given with respect to the operation of the musical tone control apparatus according to the first embodiment. In the case where the music is to be performed, the player mounts the present musical tone control apparatus shown in FIG. 8 to his waist at first. Next, the player mounts the sensors for detecting the movement of body (e.g., the potentiometers 8a and 8b shown in FIG. 1) at several positions, and then the wires of the sensors are connected to the connectors 112 and 120. In the case where the musical tone generating apparatus is driven by wire, the musical tone generating apparatus is connected to the output terminal 131a by the wire. Thereafter, the power is applied to the musical tone generating apparatus and the musical tone control apparatus mounted at the player's waist.

Then, the cover of holding portion SN4 is opened, and the push switches SW of the operating portion 126 are operated to thereby input the information representative of wire or wireless operation (i.e., the connecting method of the musical tone generating apparatus) and the kind of sensors mounted to the player's body. When such sensor kind is inputted, the CPU 118 detects such sensor kind so that the CPU 118 outputs the select data SD1 and SD2 to the analog switch circuits 113 and 121 based on whether the sensor output is analog signal or digital signal. Thus, the input signal of connector 112 is supplied to one of the A/D converter 114 or buffer amplifier 115, while the input signal of connector 120 is supplied to one of the A/D converter 122 or buffer amplifier 123.

Next, the player operates the start push switch SW for commanding the start operation and then the cover of holding portion SN4 is closed. Thereafter, the player starts to perform body actions such as rhythm exercises. After this start push switch SW is operated, the input signals of connectors 112 and 120 are periodically written into the registers 116 and 124 as the sensor data. The CPU 118 sequentially transmits such sensor data to the RAM 128. Based on such transmitted sensor data, the CPU 118 generates and then outputs the tone pitch data (i.e., the key code), tone color data, tone volume data and key-on/off signals etc. to the MIDI circuit 131. This MIDI circuit 131 converts the supplied data and signals into the data of MIDI standard. Such data of MIDI standard are passed through the output terminal 131a and cable and then supplied to the musical tone generating apparatus from which the musical tones are generated based on the data of MIDI standard.

Incidentally, when "wireless transmission" is selected as the transmitting means for the musical tone generating apparatus, the tone pitch data, for example, are supplied to the transmitter 130. In addition, the LCD indicator 129 displays the names of sensors which are selected by operating the push switches SW.

As described heretofore, some groups of parts are held in plural modules (i.e., holding portions), and these modules are respectively and independently arranged on the belt in the first embodiment. Hence, the musical tone control apparatus according to the first embodiment does not disturb the player's movement. In addition, the first embodiment is advantageous in that the carrying of musical tone control apparatus becomes easy.

[B] SECOND EMBODIMENT

Figure 14:
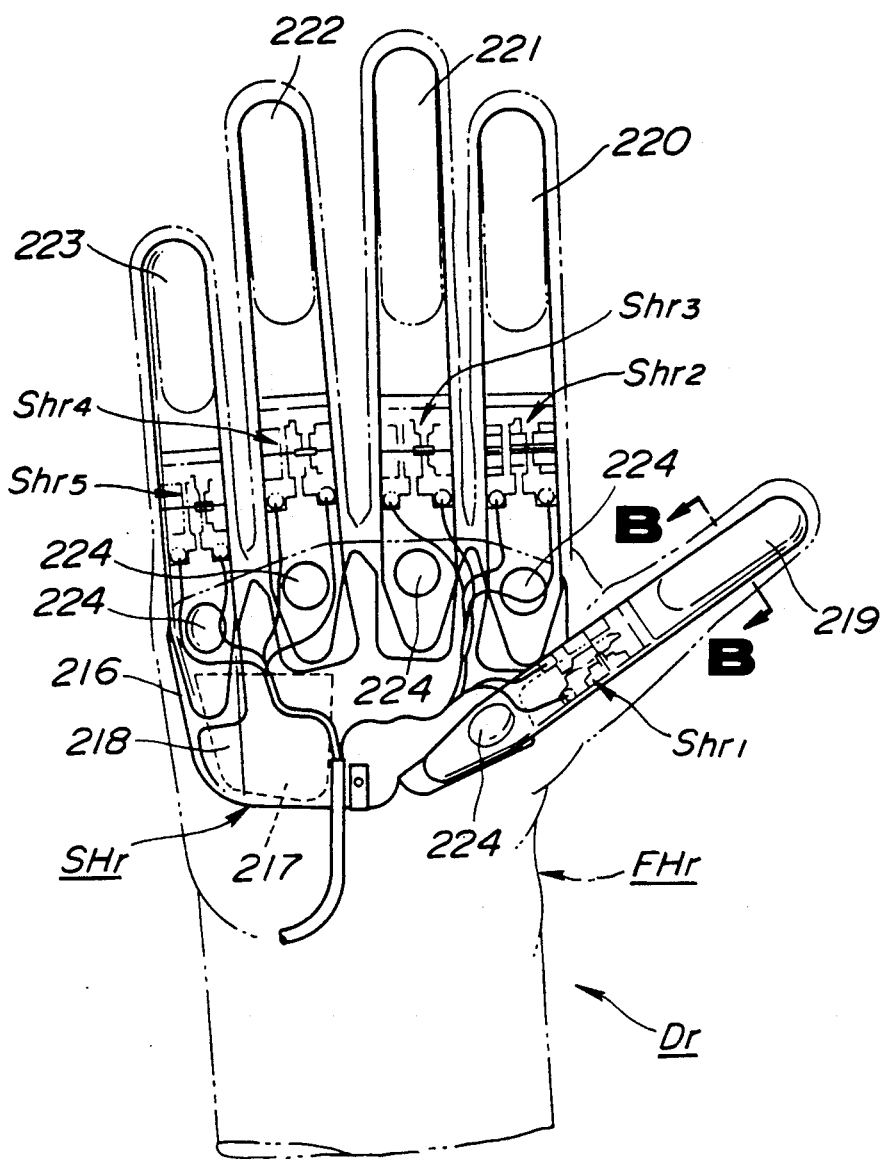
FIG. 14 is a view showing an appearance of a detecting portion for right hand which is applied in a musical tone control apparatus according to a second embodiment.

Next, description will be given with respect to the musical tone control apparatus according to the second embodiment. FIG. 14 is a plan view showing a constitution of detecting portion Dr for right hand. In FIG. 14, the detecting portion Dr comprises a detector SHr having the palm shape of right hand and a glove FHr for mounting this detector SHr. 216 designates a first supporting member made of the plastics As shown in FIG. 15, the first supporting member 216 has the shape of hand without fingers. As shown in FIG. 16 (which is the sectional view taken in the direction of the arrows substantially along the line A—A of FIG. 15), the little finger root portion and its lower portion and the thumb root portion and its lower portion are respectively bent upwards along the palm of hand. In addition, as shown in FIG. 15, a plane fastener 217 is mounted at lower left portion of the first supporting member 216. Next, 218 designates a second supporting member formed by the same material of first supporting member 216 and mounted at the front face of the first supporting member 216. As shown in FIG. 17, each of cuttings 218a to 218d is formed at each finger root portion without the thumb root portion T in the second supporting member 218. Each of finger members 219 to 223 is formed in the longitudinal direction of each finger. More specifically in FIG. 14, the finger member 219 is in contact with the thumb, the finger member 220 is in contact with the index finger, the finger member 221 is in contact with the middle finger, the finger member 222 is in contact with the third finger, and the finger member 223 is in contact with the little finger. Each finger member is formed by the same material of the first and second supporting members, and each finger member has the shape which can be fitted with each finger. As shown in FIG. 18 (which is the fragmentary view taken in the direction of arrows along the line B—B in FIG. 14), the sectional shape of each finger member is curved along each finger shape so that each finger can not be removed from each finger member. In addition, each of finger members 220 to 223 is mounted to the first supporting member 216 by each pin 224 at each cutting of the second supporting member 218 so that each finger member can be freely revolved around each pin 224. Further, the finger member 219 is mounted to the second supporting member 218 by the pin 224 so that the finger member 219 can be freely revolved. Due to stage differences among the cuttings of the second supporting member 218, the finger members 219 to 223 are prevented from being crossed. Furthermore, joint switches Shr1 to Shr5 are respectively provided at center positions of the finger members 219 to 223.

Figure 19:
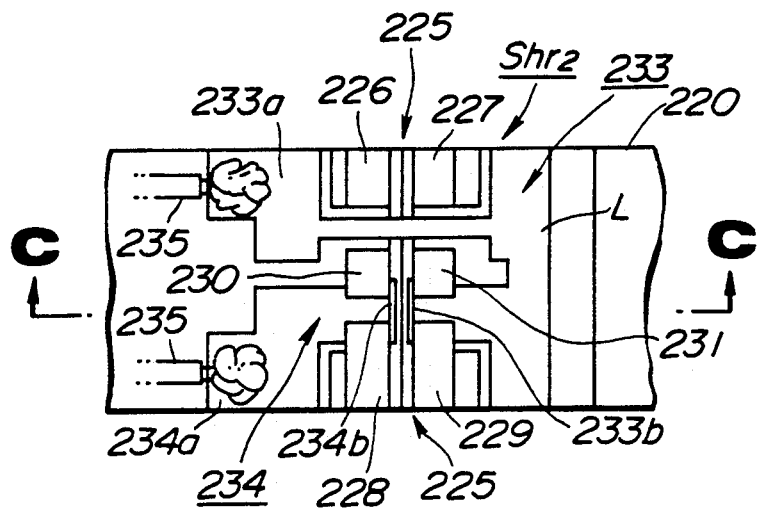
FIG. 19 is a plan view showing the constitution of a joint switch used in the detecting portion shown in FIG. 14.
Figure 20:
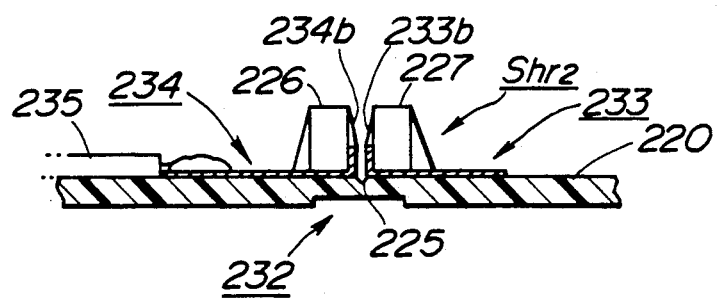
FIG. 20 is a sectional view taken in the direction of arrows along the line C—C in FIG. 19.

Next, description will be given with respect to each constitution of joint switches Shr1 to Shr5. FIG. 19 shows the joint switch for index finger, and FIG. 20 shows the sectional view taken in the direction of the arrows along the line C—C in FIG. 19. In FIGS. 19 and 20, 225 designates a cutting formed in the width direction of the finger member 220. As shown in FIG. 20, this cutting 225 has a V-shape. 226 and 227 designate blocks each having the cubic shape. On the side edge portion of finger member 220 in its width direction, these blocks 226 and 227 are arranged at facing positions by the width of cutting 225. Similarly, 228 and 229 designate blocks each having the cubic shape. On another side edge portion of finger member 220 in its width direction, these blocks 228 and 229 are arranged at facing positions by the width of cutting 225. 230 and 231 designate blocks each having the cubic shape. The block 230 is arranged at the middle position between the blocks 226 and 228, while the block 231 is arranged at the middle position between the blocks 227 and 229. In, this case, the blocks 230 and 231 face to each other but are separated by the width of cutting 225. 232 shown in FIG. 20 designates a cutting having concave shape. This cutting 232 is formed at the position in the back face of finger member 220 which indirectly faces the cutting 225.

Meanwhile, 233 designates an electrode which has a terminal portion 233a, conductive line L and contact portion 233b. The terminal portion 233a is positioned at the left side of the blocks 226 and 230. One edge of the conductive line L is connected to the terminal portion 233a, while another edge of the conductive line L is stretches to the edge in left side of the blocks 229 and 231 via the cutting 225. The contact portion 233b is connected to the conductive line L at the edge in left side of the blocks 229 and 231. In addition, 234 designates an electrode having a terminal portion 234a and contact portion 234b. The terminal portion 234a is arranged at the left side of the blocks 228 and 230. The contact portion 234b is connected to this terminal portion 234a and arranged at the facing position of the contact portion 233b so that the contact portion 234b is in contact with the edges of the blocks 228 and 230. Further, 235 designates cables each connecting to each of the terminal portions 233a and 234a. As described heretofore, the detecting portion Dr for right hand is constituted. In addition, the detecting portion Dl for left hand (not shown) is also constituted as similar to the detecting portion Dr for right hand. This detecting portion Dl provides joint switches Sh11 to Sh15 for respective fingers.

Figure 21:
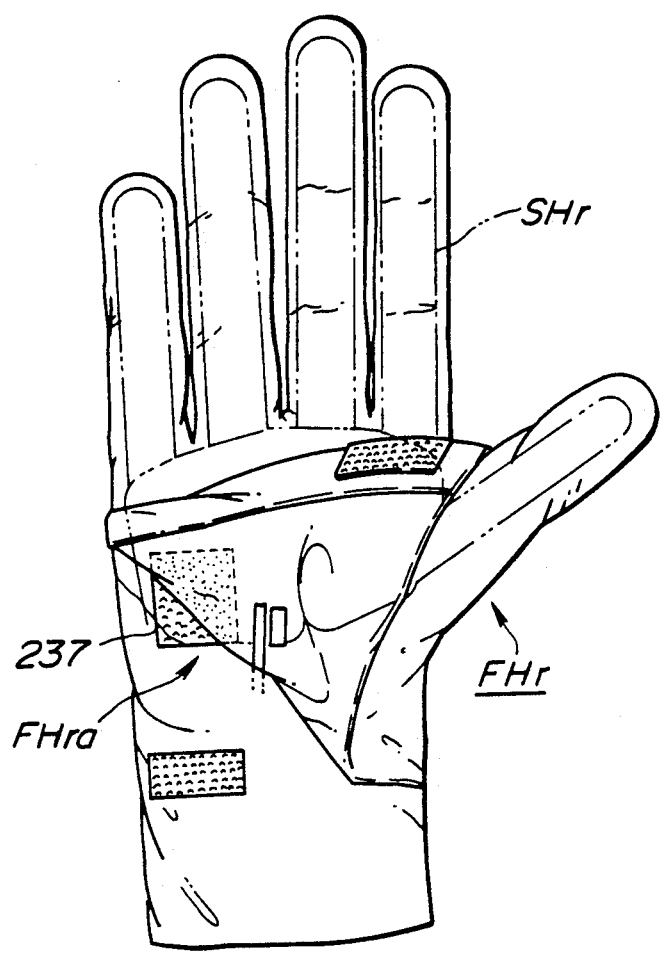
FIG. 21 is a plan view showing a glove used in the detecting portion shown in FIG. 14.
Figure 22:
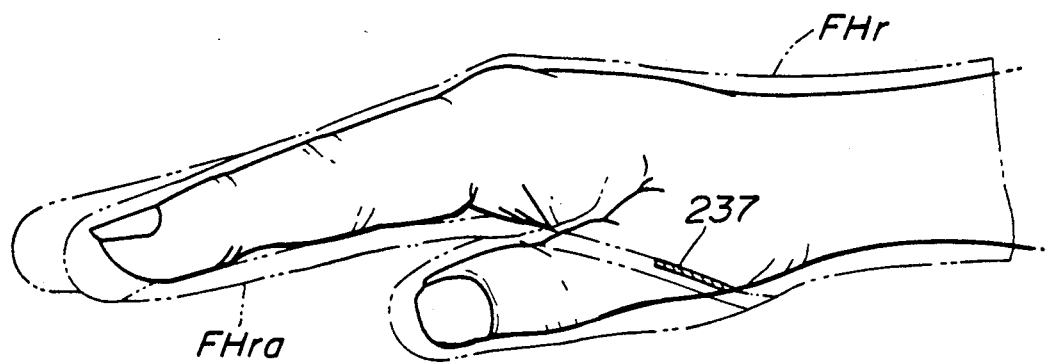
FIG. 22 is a side view of FIG. 21.

Next, description will be given with respect to the glove FHr for right hand. FIG. 21 is a plan view showing the appearance of the glove FHr, while FIG. 22 is a side view thereof. This glove FHr is formed as double construction because this glove FHr provides an insert portion FHra for inserting a detector SHr at the palm of right hand. This insert portion FHra is mounted with plane fastener 237 having the predetermined size. This plane fastener 237 is used for connecting with the plane fastener 217 mounted at the detector SHr (see FIG. 14). The glove FHr is constituted as described heretofore. Similar to this glove FHr, another glove FHl for left hand (not shown) is constituted.

Figure 23A:
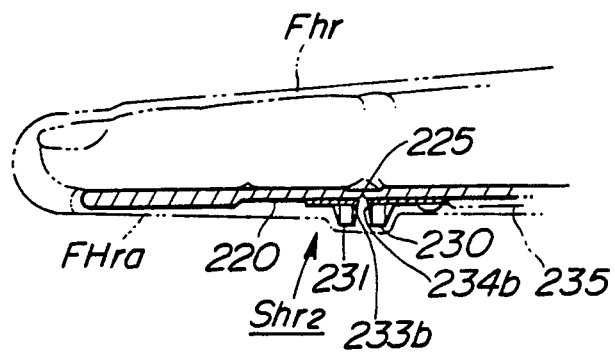
FIGS. 23A to 23C are side views for explaining a movement of finger member used in the detecting portion shown in FIG. 14.
Figure 23B:
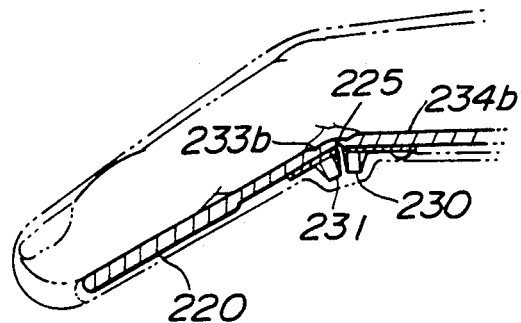
Figure 23C:
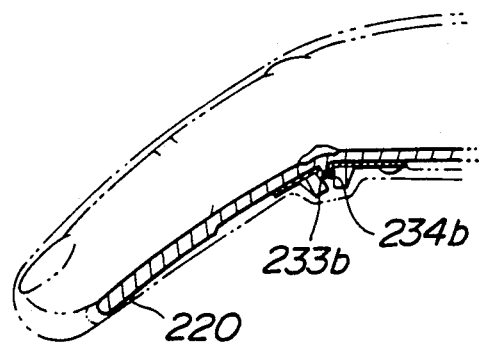

The detecting portion Dr consisting of the detector SHr and glove FHr is worn by the player's right hand. Thereafter, when the player bends his index finger of right hand as shown in FIG. 23A, the cutting 235 whose thickness is smaller than that of other portions must be bent at first. Then, when the upper portion of finger member 220 is bent by the predetermined angle as shown in FIG. 23B, the block 230 comes in contact with the block 231 and the block 228 also comes in contact with the block 229 in the joint switch Shr2. Therefore, the contact portion 233b, 234b is conducted with the contact portion 233b. Next, when the player further bends his finger as shown in FIG. 23C, the finger member 220 itself is bent because of its flexible material. For this reason, excessive stress is not applied to the contact portions 233b and 234b, and consequently these contact portions will not be broken.

In FIG. 7, instead of the finger switches Sr1 to Sr5 and S11 to S15, the joint switches Shr1 to Shr5 of the detector SHr and the joint switches Sh11 to Sh15 of the detector SHl are connected to the key code generating circuit 42 by the cables 235. The key code generating circuit 42 inputs on/off states of these joint switches Shr1 to Shr5 and Sh11 to Sh15 and also inputs tone color code TC from the tone color setting switch 44. Based on the inputted on/off states of joint switches and the tone color code TC, the key code generating circuit 42 generates the key code KC.

Figure 24:
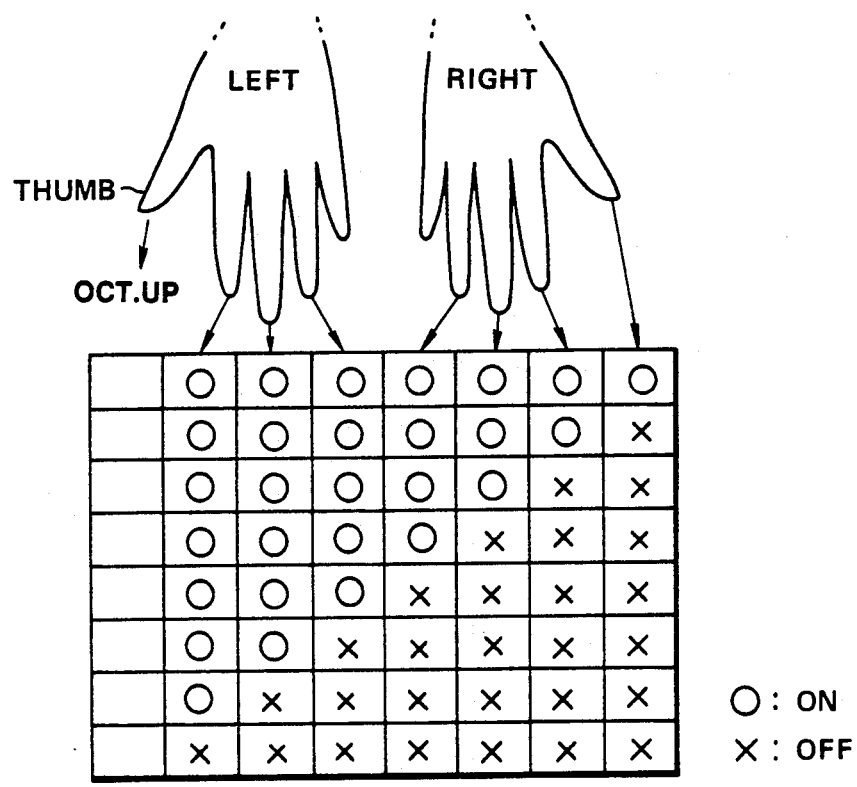
FIG. 24 is a diagram showing relation between operations of fingers and musical scale of saxophone.

FIG. 24 shows the relation between the on/off states of joint switches (where o: on, x: off) and the musical scale in the case where the tone color of saxophone is applied as the set tone color of the tone color setting switch 44 (FIG. 7). The key code generating circuit 42 generates the key code KC corresponding to each of musical scale, "do", "re", "mi", ... in response to the operation of each finger. In this case, based on the on/off states of the joint switch Sh11 which is turned by the left thumb, octave number and its key code KC are changed over.

Figures 25, 26:
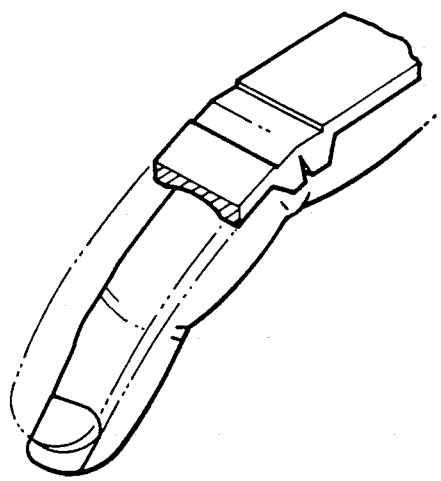
FIG. 25 is a diagram showing relation between operations of fingers and musical scale of trumpet.
FIG. 26 is a perspective side view showing partial constitution of detecting portion according to a modified example of second embodiment.

On the other hand, FIG. 25 shows the relation between the on/off states of joint switches and the musical scale in the case where the tone color of trumpet is applied as the set tone color of the tone color setting switch 44. This relation shown in FIG. 25 is different from that shown in FIG. 24.

Then, the key code generating circuit 42 sequentially generates and outputs the key code to the musical tone signal generating circuit 43 from which the musical tone signal having the musical scale corresponding to the key code KC and the tone color corresponding to the tone color code TC will be outputted. Such musical tone signal drives the speaker SP.

In this state, when the player sets the tone color by operating the tone color setting switch 44, the musical tone signal generating circuit 43 inputs the new tone color code TC so that the tone color of the musical tone to be generated is changed. When the player performs his fingers as shown by FIG. 24 or 25 in accordance with the musical scale of tune to be performed, the speaker SP generates the musical tones having the tone color of saxophone or trumpet. Thus, by arbitrarily setting the desirable tone color, the present musical tone control apparatus can perform the tune by the same performance on the real musical instrument.

Incidentally, since each finger member is curved in order to fit the shape of each finger, it is possible to improve the holding ability of finger so that each finger will not be removed with ease. In addition, the detector SHr is fitted with the palm of hand, so that each joint switch can be easily depressed with good sense of each finger. Further, the detector SHr can be freely removed from the glove FHr because of the plane fastener. For this reason, it is possible to exchange the detector SHr and wash the glove FHr. Further, since the connecting area of the plane fasteners 237 can be varied, it is possible to perfectly adjust the positions of detector SHr even if the size of player's hand differs by each person.

The second embodiment is designed to mount the detecting portion at the palm of hand. However, it is possible to redesign the second embodiment to mount the detecting portion at the back of hand. FIG. 26 is a perspective side view showing the constitution of such finger member whose sectional shape is curved to be fitted with the back of finger. In this case, it is advantageous in that the player can hold another musical instrument or microphone at the same time.

[C] THIRD EMBODIMENT

Figure 27:
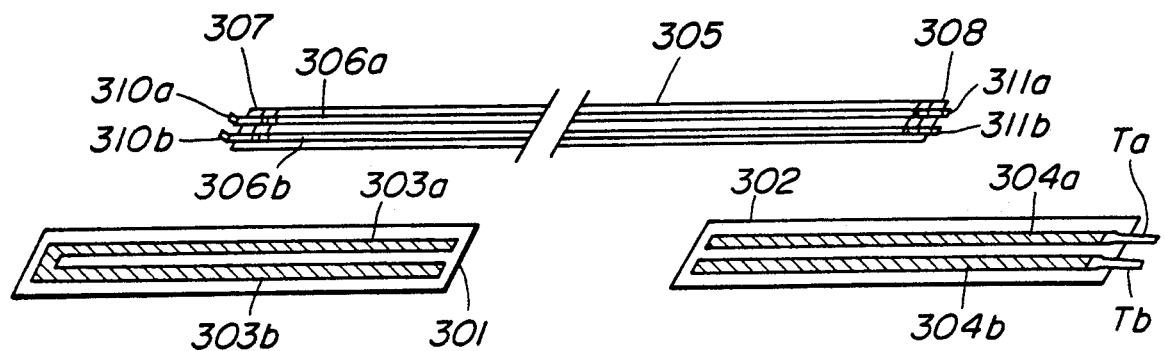
FIG. 27 is a perspective side view showing a third embodiment.

FIG. 27 is a perspective side view showing the partial constitution of the third embodiment. In FIG. 27, 301 and 302 each designates a thin resistor plate. On the upper face of this resistor plate 301, carbon resistors 303a and 303b are formed in parallel in the longitudinal direction and connected to each other, so that U-shaped carbon resistor is formed. On the upper face of the resistor plate 302, carbon resistors 304a and 304b are formed in parallel. In addition, terminals Ta and Tb are respectively connected to one edges of the carbon resistors 304a and 304b. 305 designates a sliding plate formed by metal such as stainless steel. On the upper face of the sliding plate 305, stripe-shaped conducting portions 306a and 306b each constituted by a strip of flexible base plate are provided in parallel in the longitudinal direction. Further, insulating portions 307 and 308 are respectively provided at both edges of the sliding plate 305. The edges of the conducting portions 306a and 306b reach at the edges of the insulating portions 307 and 308. Furthermore, 310a and 310b designate brushes mounted on the insulating portion 307. These brushes 310a and 310b conduct to the conducting portions 306a and 306b and slide along the carbon resistors 303a and 303b respectively. Similarly, 311a and 311b designate brushes mounted on the insulating portion 308. These brushes 311a and 311b conduct to the conducting portions 306a and 306b and slide along the carbon resistors 304a and 304b respectively.

Figure 28:
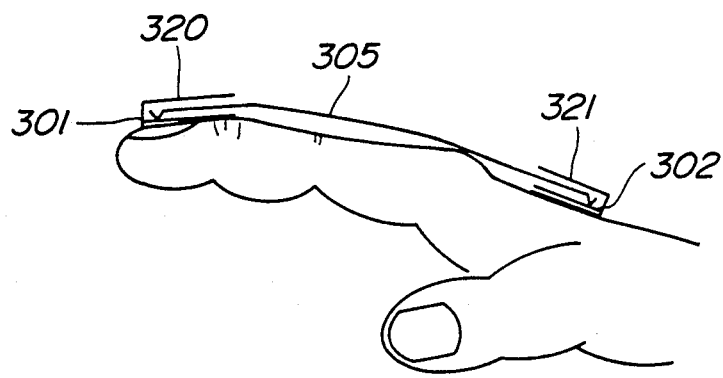
FIGS. 28 and 29 are side views for explaining movement of the third embodiment.
Figure 29:
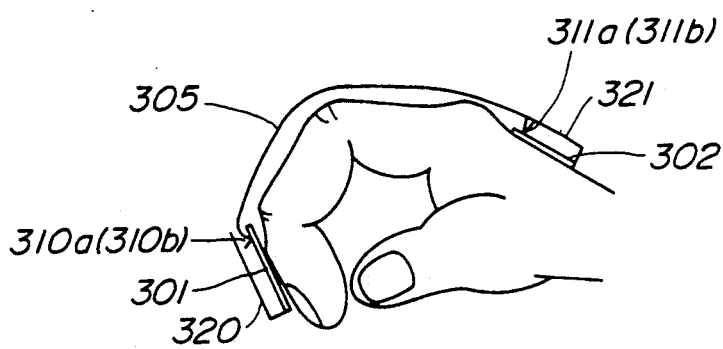

Next, 320 and 321 shown in FIG. 28 designate casings which are respectively fixed at the finger tip and finger root. The openings of these casings 320 and 321 are positioned to thereby face to each other. In addition, the resistor plates 301 and 302 are respectively fixed at the bottoms of these casings 320 and 321. Both edges of the sliding plate 305 are respectively inserted into the casings 320 and 321. In such state, the brushes 310a and 310b slide on the carbon resistors 303a and 303b respectively, while the other brushes 311a and 311b slide on the carbon resistors 304a and 304b respectively. For example, when the finger is bent as shown in FIG. 29, the curved distance between the casings 320 and 321 becomes longer. As a result, the brushes 310a and 310b are moved to the opening side of the casing 320, while the brushes 311a and 311b are moved to the opening side of the casing 321. Thus, the sliding positions of the brushes 310a, 310b, 311a and 311b must be changed in response to the bending movement of the finger. In this case, each brush is moved to the opening side or closing side of each casing.

FIG. 30 shows an equivalent circuit of the third embodiment. In FIG. 30, parts identical to those in FIG. 27 will be designated by the same numerals.

Now, the brushes are at the positions as shown by the solid lines, and then the finger is bent (see FIG. 29). When the finger is bent, the brushes are moved to the opening sides of the casings 320 and 321, so that the contact positions between the brushes and carbon resistors will be moved as shown by dotted lines in FIG. 30. In this case, if each resistance variation of each carbon resistor is $\Delta R$, the resistance variation between the terminals Ta and Tb must be $(\Delta R + \Delta R + \Delta R + \Delta R) = 4\Delta R$. On the other hand, when the finger is stretched, the brushes are moved to the closing sides of the casings 320 and 321, so that the contact positions will be moved as shown by dashed lines in FIG. 30. In this case, if each resistance variation of each carbon resistor is $\Delta R$, the resistance variation between the terminals Ta and Tb must be $-\Delta R - \Delta R - \Delta R - \Delta R = -4\Delta R$. Since the moving distance of the brushes corresponds to the bending of finger, the total resistance value of the carbon resistors between the terminals Ta and Tb must correspond to the bending of finger.

In the third embodiment, the voltage Vo is applied to each carbon resistor via a resistor Ra as shown in FIG. 31. As a result, an analog signal Sa corresponding to the bending of finger is outputted from terminals Ta and Tb. As the bending of finger becomes larger, the value of signal Sa becomes larger, for example.

Next, description will be given with respect to the electric constitution of the third embodiment in conjunction with FIG. 32.

A musical tone processing circuit 317 shown in FIG. 32 is provided independent from the sliding plate 305, casings 320 and 321. 318 designates a comparator circuit which outputs the key-on signal KON when the value of analog signal Sa exceeds over a threshold value outputted from a threshold value circuit 319. Therefore, the threshold value of threshold value circuit 319 determines the bending of finger for generating the key-on signal KON. The analog signal Sa is supplied to the comparator circuit 318 by code or by wireless.

Then, a register 323 temporarily stores the key-on signal KON. 325 designates a CPU for controlling each portion of the present apparatus, while 326 designates a memory for storing programs and data which are used in the CPU 325. When the CPU 325 reads data from the register 323, the register 323 is reset.

In addition, 327 designates a tone generator which generates the predetermined musical tone signal when the CPU 325 supplies the key-on signal KON. In advance, predetermined kinds of musical tones are preset in the tone generator 327. One of the musical tones is selected by a select switch (not shown).

Next, description will be given with respect to the operation of the third embodiment.

First, the player fixes the casings 320 and 321 at the finger tip and finger root respectively such that both edges of the sliding plate 305 can be inserted to the casings 320 and 321 respectively. Then, the player arbitrarily bends his finger providing the above casings etc. in accordance with the movement of dance and the like. When such player's finger is bent, the signal Sa whose value corresponds to the bending of player's finger is to be outputted. Thereafter, when the value of this signal Sa exceeds over the threshold value, the comparator circuit 318 outputs the key-on signal KON. At this timing, the tone generator 327 generates the musical tone signal.

Incidentally, in the above-mentioned third embodiment, the casings and related parts are mounted at the finger. However, it is possible to mount these at player's elbow or knee and the like.

Figure 33:
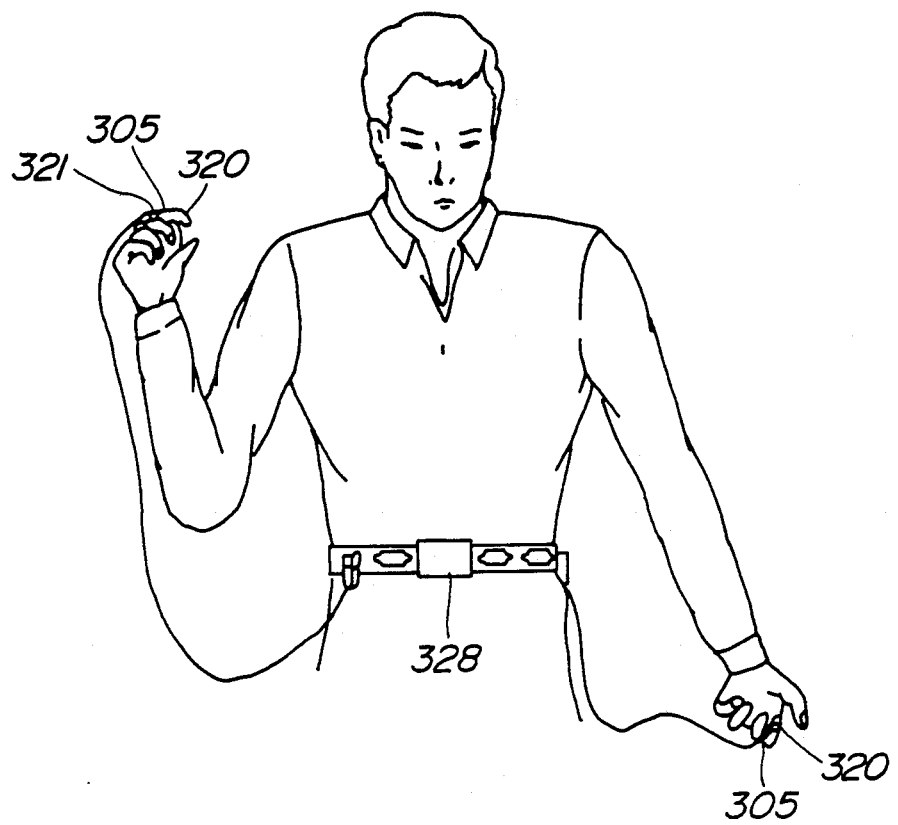
FIG. 33 is a view showing an appearance of player who wears a first modified example of third embodiment.

FIG. 33 shows a first modified example of the third embodiment, wherein the musical tone processing circuit 317 shown in FIG. 32 is held within a casing 328 which is mounted at the player's waist by a belt. In this case, it is preferable to provide an interface circuit for outputting the musical tone control signal of MIDI standard instead of the tone generator 327.

Figure 34:
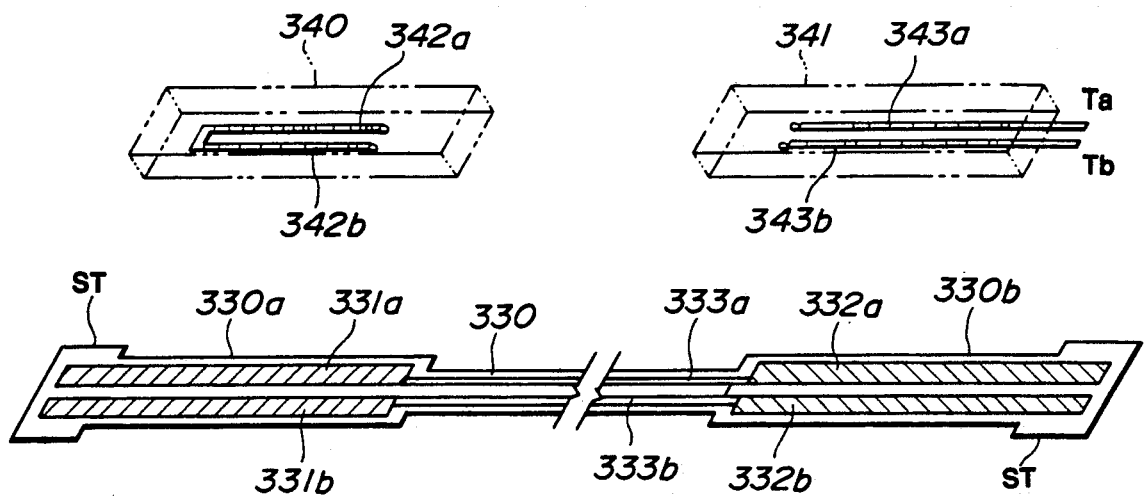
FIGS. 34 to 36 are views for explaining a second modified example of third embodiment.

Next, description will be given with respect to a second modified example of the third embodiment. FIG. 34 is a perspective side view showing this second modified example of third embodiment. In FIG. 34, 330 designates a thin slide plate having wide edge portions 330a and 330b which are relatively wider than other parts thereof. Carbon resistors 331a and 331b are provided in parallel on the wide edge portion 330a in its longitudinal direction, while other carbon resistors 332a and 332b are provided in parallel on the wide edge portion 330b in its longitudinal direction. In addition, conducting portions 333a and 333b are provided in parallel on the slide plate 330 in its longitudinal direction. The carbon resistors 331a and 332a are connected by the conducting portion 333a, while the carbon resistors 331b and 332b are connected by the conducting portion 333b. The tip edge portions of the wide edge portions 330a and 330b are formed even wider so that these tip edge portions form stoppers ST.

Figure 35:
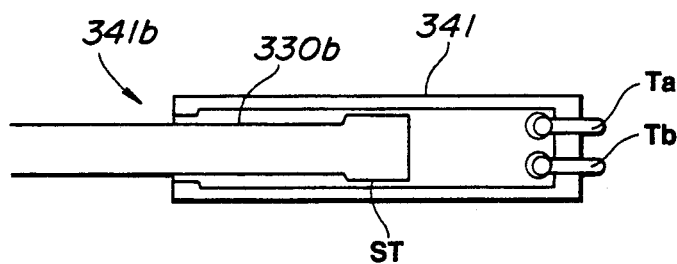

Further, 340 and 341 each designates a rectangular casing. Similar to the foregoing casings 320 and 321, these casings 340 and 341 each having the opening portion are mounted at the finger tip and finger root. This casing 340 provides brushes 342a and 342b which will slide along the carbon resistors 331a and 331b respectively, and these brushes 342a and 342b are connected in the U-shape. On the other hand, the casing 341 provides brushes 343a and 343b which will slide along the carbon resistors 332a and 332b. One edges of these brushes 343a and 343b are connected to the terminals Ta and Tb. FIG. 35 shows relation between the casing 341 and wide edge portion 330b. The casing 341 has the opening portion 341b which is formed relatively narrow so that the stopper ST can not pass through this opening portion 341b. Therefore, the wide edge portion 330b can be freely moved as between the state where the tip edge thereof is in contact with the side face of the casing 341 and another state where the stopper SP is in contact with the opening portion 341b.

Figure 36:
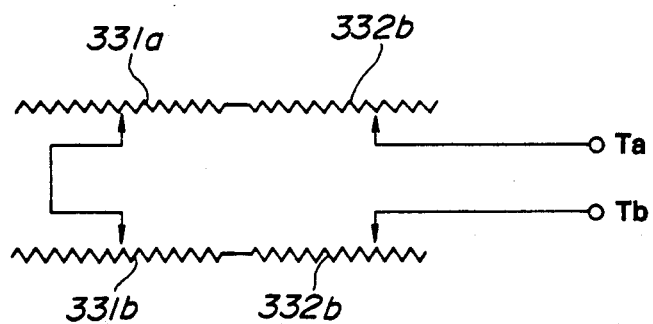

When the player mounts the casings 340 and 341 etc. at his finger and then bends his finger, the contact positions among the brushes and carbon resistors must be varied. Similar to the third embodiment described before, such variation corresponds to the bending of finger. As is apparent from FIG. 36, the total resistance between the terminals Ta and Tb must be varied in response to the bending of finger, so that the analog signal Sa whose value corresponds to the bending of finger can be obtained.

This second modified example is different from the third embodiment in that the carbon resistors slide on the brushes.

Incidentally, the third embodiment and its modified examples output the key-on signal KON based on the result of comparing result of the signal Sa and threshold value. However, it is possible to control the tone volume, musical scale or the like based on the value of analog signal Sa, for example.

[D] FOURTH EMBODIMENT

Figure 37:
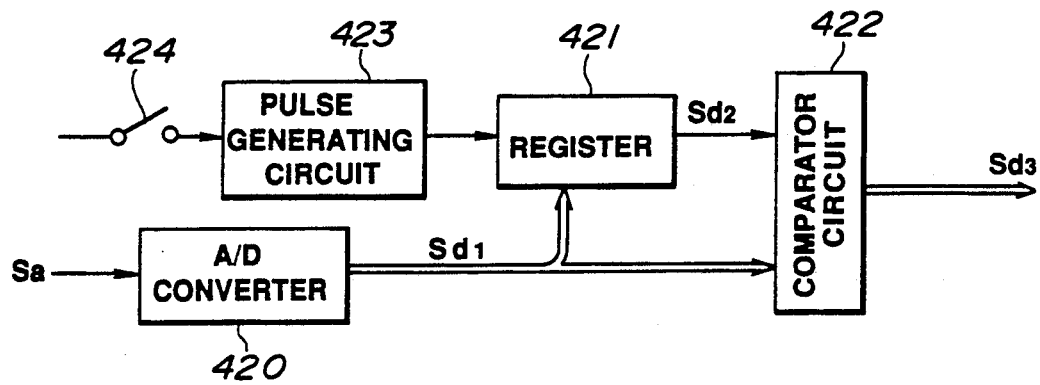
FIGS. 37 and 38 are block diagrams showing an electric constitution of fourth embodiment.

Next, description will be given with respect to the fourth embodiment. The parts for outputting the analog signal Sa in the fourth embodiment are identical to those in the third embodiment (see FIGS. 27 to 29), hence, description thereof will be omitted. However, the electric constitution of fourth embodiment is different from that of third embodiment (i.e., the musical tone processing circuit 317 in FIG. 32). Hence, hereinafter, description will be focused on the electric constitution of fourth embodiment FIG. 37 shows partial electric constitution of the fourth embodiment. In FIG. 37, 420 designates an A/D converter for converting the analog signal Sa into a digital signal Sdl which is supplied to a register 421 and a first terminal of comparator circuit 422. The register 421 is designed to store the digital signal Sdl when a pulse generating circuit 423 supplies a pulse signal thereto. In addition, an output signal Sd2 of the register 421 is supplied to a second terminal of comparator circuit 422. The above pulse generating circuit 423 outputs one pulse when a switch 424 is turned on. This switch 424 is mounted at the position where the player can arbitrarily operate such switch 424. The comparator circuit 422 subtracts the signal Sd2 from the signal Sdl to thereby output a difference signal Sd3.

Figure 38:
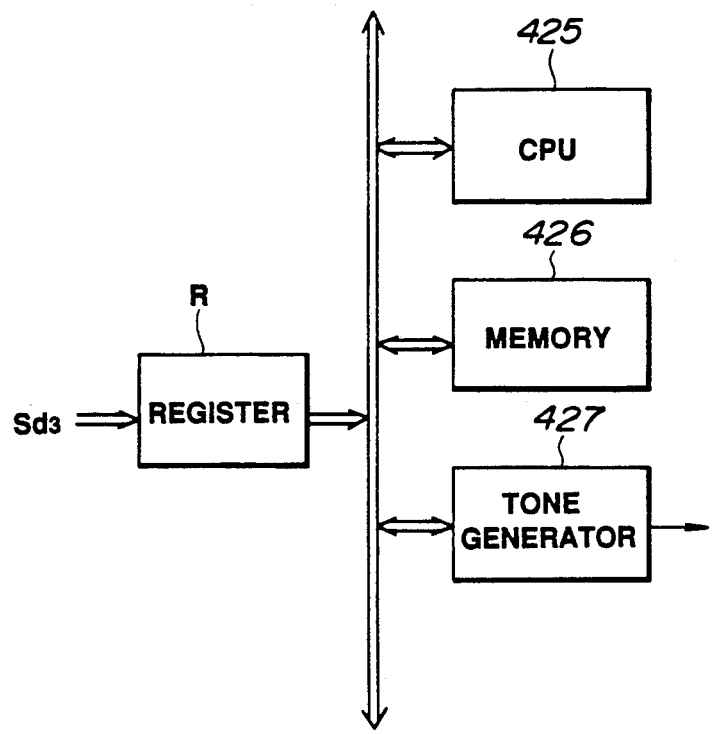

The above difference signal Sd3 is then supplied to a register R shown in FIG. 38. The value of data stored in this register R is inputted by a CPU 425. A memory 426 pre-stores the predetermined value. When the value of data stored in the register R exceeds over the predetermined value, the CPU 425 outputs the key-on signal. At the timing when the key-on signal is outputted, a tone generator 427 generates the musical tone signal. In this case, the level of signal Sd3 must be varied by the value of signal Sd2 outputted from the register 421, and then the key-on signal is generated by comparing the value of this signal Sd3 with the predetermined value stored in the memory 426. Therefore, the value of signal Sd2 functions as the threshold value.

Next, description will be given with respect to the operation of fourth embodiment. As similar to the third embodiment, the fourth embodiment outputs the signal Sa whose value corresponds to the bending of finger. Then, as described before, the key-on signal is generated based on such signal Sa. Due to this key-on signal, the musical tone is generated.

In this state, when the player operates the switch 424, the signal Sd2 at this timing is written into the register 421 so that the signal Sd2 at this timing will be a new threshold value. For example, in the case where the player operates the switch 424 when the player slightly bends his finger, thereafter, the key-on signal must be generated at every time when the player slightly bends his finger. On the other hand, in the case where the player operates the switch 424 when the player bends his finger sharp, thereafter, the key-on signal must be generated when the bending angle of finger is sharp. As described above, by operating the switch 424, the player can change the timing of generating the key-on signal.

Incidentally, it is possible to re-design the fourth embodiment so that comparator 422 directly outputs the key-on signal when the value of signal Sdl exceeds over the value of signal Sd2. Instead of the signal Sdl, it is possible to use an output signal of volume as the signal of threshold value written into the register 421, for example. In this case, after the desirable threshold value is set by the volume, the threshold value stored in the register 421 is renewed by operating the switch 424. Further, it is possible to re-design the fourth embodiment such that the tone volume and tone pitch etc., are controlled based on the value of data stored in the register R.

Figure 39:
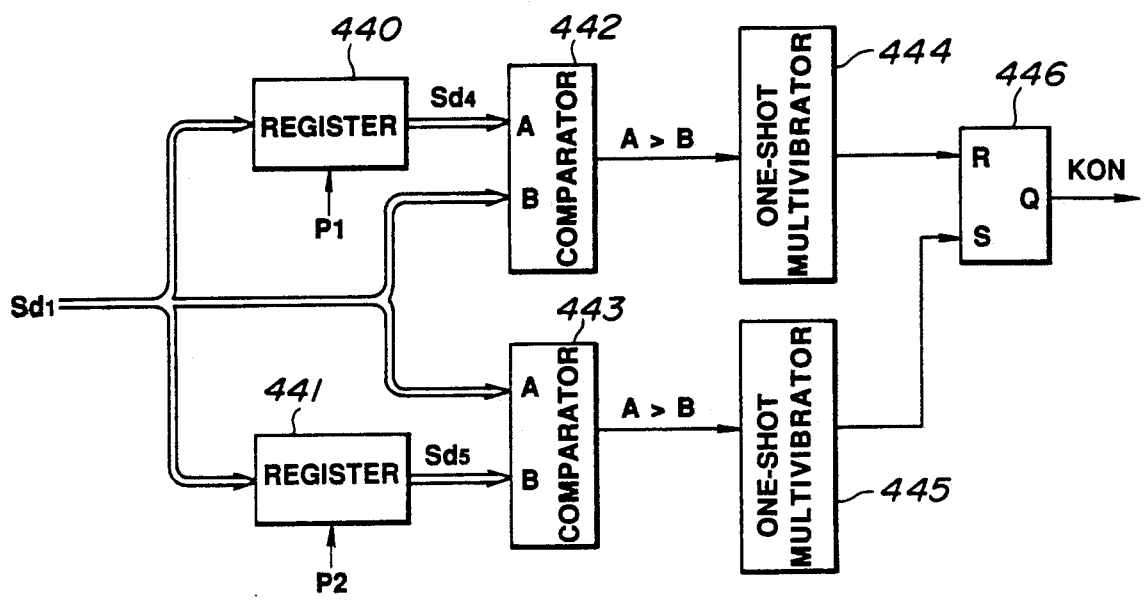
FIG. 39 is a block diagram showing a modified example of fourth embodiment.
Figure 40:
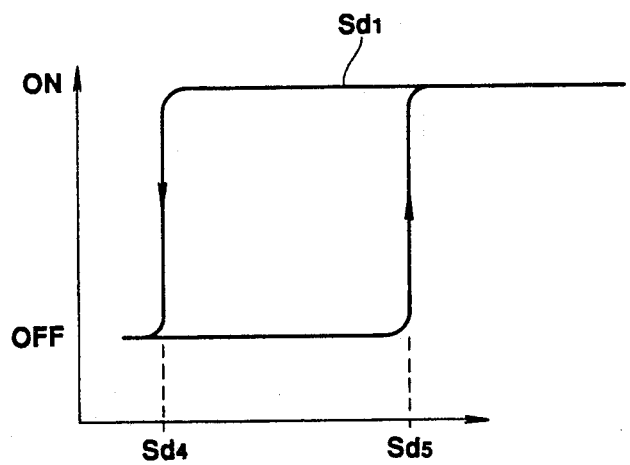
FIG. 40 is a graph showing hysterisis characteristic of key-on signal in FIG. 39.

Next, description will be given with respect to a modified example of fourth embodiment in conjunction with FIGS. 39 and 40. In FIG. 39, 440 and 441 designate registers which input the signal Sdl when pulse signals P1 and P2 are supplied thereto. Similar to the fourth embodiment, these pulse signals P1 and P2 are outputted from external devices (not shown) when the predetermined switch is operated. In addition, 442 and 443 designate comparators each outputting a high level (i.e., "H" level) signal when a level of signal inputted to its A terminal becomes larger than a level of signal inputted to its B terminal. The signal Sdl is supplied to the B terminal of comparator 442 and the A terminal of comparator 443. In addition, the register 440 outputs a signal Sd4 to the A terminal of comparator 442, while the register 441 outputs a signal Sd5 to the B terminal of comparator 443. Further, 444 and 445 designate one-shot multivibrators each outputting the pulse when the level of its input signal rises. The output signals of these one-shot multivibrators 444 and 445 are respectively supplied to reset terminal R and set terminal S of a flip-flop 446. The output signal of this flip-flop 446 is outputted as the key-on signal KON. This key-on signal KON is supplied to the CPU 425 shown in FIG. 38, from which the musical tone control signal will be generated.

In this modified example as described above, the value of data stored in the register 440 is set smaller than the value of data stored in the register 441, for example. In this case, when the value of signal Sdl exceeds over the value of signal Sd5, the flip-flop 446 is set so that the key-on signal KON is outputted. On the other hand, when the value of signal Sd4 exceeds over the value of signal Sdl, the flip-flop 446 is reset so that the key-on signal KON is stopped. Therefore, the hysterisis characteristic as shown in FIG. 40 can be established between the key-on signal KON and level of signal Sdl.

Due to such hysterisis characteristic, the key-on signal KON can become stable even if the finger of player is deviated in the vicinity of the timing of generating the key-on signal KON.

Incidentally, in this modified example, the threshold values of the registers 440 and 441 can be arbitrarily changed. In addition, it is possible to employ the acceleration sensor which is mounted to the player's hand or foot instead of the sensing device for sensing the bending of player's finger as shown in FIGS. 27 to 29.

The above is whole description of preferred embodiments of the present invention. This invention may be practiced or embodied in still other ways without departing from the spirit or essential character thereof as described heretofore. Therefore, the preferred embodiments described herein are illustrative and not restrictive, the scope of the invention being indicated by the appended claims and all variations which come within the meaning of the claims are intended to be embraced therein.

What is claimed is:

1. A belt type musical tone control apparatus, comprising:
   (a) detecting means, adapted to be mounted on at least one of a player's hand or foot, for detecting movement of the player; and
   (b) control means, adapted to be mounted at the player's waist by use of a belt, for generating musical tone control data based on the detection result of said detecting means, said musical tone control data being outputted to an externally provided musical tone generating apparatus from which a musical tone controlled by said musical tone control data is generated, said control means comprising a plurality of separable parts arranged respectively and independently along a longitudinal direction of said belt.

2. A belt type musical tone control apparatus according to claim 1 wherein said detecting means detects at least one of bending angles of player's elbow, wrist and fingers so that said musical tone is controlled based on said bending angle.

3. A belt type musical tone control apparatus according to claim 1 wherein said control means comprises:
   (a) receiver means for receiving and then converting the output of said detecting means into detection data;
   (b) means for generating said musical tone control data based on said detection data; and
   (c) output means for outputting said musical tone control data to said musical tone generating apparatus by wire or by wireless.

4. A musical tone control apparatus, comprising:
   (a) a supporting member, adapted to be mounted on a player's hand and which has a shape fitting at least a part of the hand;
   (b) finger members, each having a shape fitting a finger in its longitudinal direction, said finger members being mounted to said supporting member, said supporting member and said finger members constituting a detecting portion for detecting movements of the player's fingers;
   (c) joint switches each mounted at a joint portion of each finger member which is formed to be bent in accordance with bending movement of each finger, each of said joint switches being turned on when a corresponding finger member is bent; and
   (d) musical tone control means for generating a musical tone control signal based on the combination of on/off states of said joint switches, wherein the musical tone control signal may be provided to a musical tone generating apparatus for generating a musical tone in accordance with the musical tone control signal.

5. A musical tone control apparatus according to claim 4 wherein each of said joint switch comprises:
   (a) a cutting which is formed at a position corresponding to the joint portion of each finger member so that each finger member can easily bent at its joint portion; and
   (b) conducting means including first and second conducting members which are arranged at facing positions with said cutting, said first and second conducting members being in contact with each other so that each joint switch is turned on when each finger member is bent.

6. A musical tone control apparatus according to claim 4 wherein said musical tone control information is a key code for designating a desirable tone pitch.

7. A musical tone control apparatus according to claim 4 further comprising:
   (a) tone color setting means capable of arbitrarily setting a desirable tone color; and
   (b) musical tone generating means which generates the musical tone based on said key code and set tone color.

8. A musical tone control apparatus, comprising:
   (a) detecting means, adapted to be mounted to at least some of the fingers of a player, for detecting bending movements of the fingers;
   (b) mounting means which can be worn by a hand of the player, said detecting means being attached to said mounting means; and
   (c) musical tone control means for generating a musical tone control signal based on the combination of detecting results of said detecting means, wherein the musical tone control signal may be provided to a musical tone generating apparatus for generating a musical tone in accordance with the musical tone control signal.

9. A musical tone control apparatus according to claim 8 wherein said detecting means comprises:
   (a) a supporting member which has a shape fitting with at least a part of the hand;
   (b) finger members each having a shape fitting with a corresponding finger in its longitudinal direction, said finger members being mounted to said supporting member; and
   (c) joint switches each mounted at a joint portion of each finger member which is formed to be bent in accordance with bending movement of each finger, each of said joint switches being turned on when each finger member is bent.

10. A musical tone control apparatus according to claim 8 wherein said detecting means is attached to said mounting means by plane fasteners so that said detecting means can be easily removed from said mounting means.

11. A musical tone control apparatus, comprising:
    (a) resistive means, adapted to be mounted on a player's hand, wherein a resistance of the resistive means is varied in response to bending of a finger of the player, said resistance being representative of an amount of bending of the finger and said resistive means having a portion which slides in response to bending of the player's finger;
    (b) converting means for converting the resistance of said resistive means into an electric signal; and
    (c) musical tone control means for generating a musical tone control signal based on said electric signal, said musical bending of the player's finger.

12. A musical tone control apparatus according to claim 11 wherein said means comprises:
  (a) first and second casings which are respectively fixed at finger tip and finger root, said casings having opening portions which are arranged to be faced with each other;
  (b) a sliding member whose both edges can be freely inserted into said opening portions of said first and second casings respectively;
  (c) brushes which are provided within said casings or at both edges of said sliding member;
  (d) resistors which are provided on said sliding member or within said casings so that said brushes can be slid on said resistors when the player's finger is bent so that a distance between said first and second casings is varied;
  (e) conducting portions;
  (f) two terminals;
  said brushes, said resistors and said conducting portions forming one serial electric resistance circuit between said two terminals, said electric resistance circuit having resistance whose value is varied in response to the bending of player's finger.

13. A musical tone control apparatus according to claim 12 wherein the predetermined voltage is applied to said resistors so that voltage whose value corresponds to the resistance between said two terminals is obtained, said converting means including comparator means for comparing said voltage between said two terminals with the predetermined voltage, said comparator means generating a key-on signal as said musical tone control signal based on the comparing result thereof.

14. A musical tone control apparatus comprising:
  (a) sensor means for outputting information representing the magnitude of a player's motion in response to movement of the player;
  (b) memory means for pre-storing a threshold value;
  (c) rewriting means capable of arbitrarily rewriting said threshold value in said memory means;
  (d) comparator means for comparing said threshold value with said information representing the magnitude of the player's moving action; and
  (e) musical tone control means for generating a musical tone control signal in accordance with comparing results of said comparator means.

15. A musical tone control apparatus comprising:
  (a) sensor means for outputting information representing the magnitude of a player's motion in response to movement of the player;
  (b) first memory means for storing a first threshold value;
  (c) second memory means for storing a second threshold value, said first threshold value is set smaller than said second threshold value;
  (d) comparator means for comparing values of said information representing the magnitude of the player's moving action with said first and second threshold values; and
  (e) musical tone control means which outputs or stops outputting a musical tone control signal based on comparing result of said comparator means.

16. A musical tone control apparatus according to claim 15 wherein said musical tone control signal is a key-on signal and said first and second threshold values are set such that hysterisis characteristic of key-on signal can be obtained, said key-on signal being outputted when the value of said movement detecting information exceeds over said second threshold value, said key-on signal being stopped when the value of said movement detecting information becomes smaller than said first threshold value.

* * * * *